United States Patent
Koike

(10) Patent No.: US 11,404,722 B2
(45) Date of Patent: Aug. 2, 2022

(54) NEGATIVE ELECTRODE FOR SECONDARY BATTERY, SECONDARY BATTERY, BATTERY PACK, ELECTRIC VEHICLE, ELECTRIC POWER STORAGE SYSTEM, ELECTRIC TOOL, AND ELECTRONIC DEVICE

(71) Applicant: MURATA MANUFACTURING CO., LTD., Kyoto (JP)

(72) Inventor: Yosuke Koike, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 261 days.

(21) Appl. No.: 16/751,504

(22) Filed: Jan. 24, 2020

(65) Prior Publication Data

US 2020/0161701 A1 May 21, 2020

Related U.S. Application Data

(63) Continuation of application No. PCT/JP2018/027613, filed on Jul. 24, 2018.

(30) Foreign Application Priority Data

Jul. 24, 2017 (JP) .............................. JP2017-142937

(51) Int. Cl.
| | |
|---|---|
| *H01M 10/0566* | (2010.01) |
| *H01M 4/36* | (2006.01) |
| *H01M 4/62* | (2006.01) |
| *H01M 10/0525* | (2010.01) |
| *H01M 4/02* | (2006.01) |

(52) U.S. Cl.
CPC ....... *H01M 10/0566* (2013.01); *H01M 4/362* (2013.01); *H01M 4/623* (2013.01); *H01M 10/0525* (2013.01); *H01M 2004/027* (2013.01); *H01M 2300/0045* (2013.01)

(58) Field of Classification Search
None
See application file for complete search history.

(56) References Cited

U.S. PATENT DOCUMENTS

| | | | |
|---|---|---|---|
| 2007/0134546 A1* | 6/2007 | Hashimoto | C22B 7/005 429/49 |
| 2008/0241705 A1 | 10/2008 | Wakita et al. | |
| 2009/0202916 A1 | 8/2009 | Wakita et al. | |
| 2010/0018036 A1* | 1/2010 | Chang | H01M 8/1253 29/623.5 |
| 2014/0058598 A1* | 2/2014 | Matsui | H01M 4/485 701/22 |
| 2015/0125744 A1 | 5/2015 | Hosaka et al. | |
| 2015/0140423 A1 | 5/2015 | Brown et al. | |
| 2016/0293957 A1* | 10/2016 | Okae | H01M 10/0565 |

FOREIGN PATENT DOCUMENTS

| | | |
|---|---|---|
| JP | 2006-077107 | 3/2006 |
| JP | 2008218385 A | 9/2008 |
| JP | 2009193784 A | 8/2009 |
| JP | 2012-226937 | 11/2012 |
| JP | 2013168254 A | 8/2013 |
| JP | 2014139920 A | 7/2014 |
| JP | 2015038870 A | 2/2015 |
| JP | 2015090845 A | 5/2015 |
| JP | 2015525437 A | 9/2015 |
| JP | 2016048628 A | 4/2016 |

OTHER PUBLICATIONS

Machine translation of JP 2014-139920, published on Jul. 31, 2014 (Year: 2014).*
International Search Report for Application No. PCT/JP2018/027613, dated Oct. 2, 2018.
Japanese Office Action dated Aug. 10, 2021 in corresponding Japanese Application No. 2019-532620.

* cited by examiner

*Primary Examiner* — Anca Eoff
(74) *Attorney, Agent, or Firm* — K&L Gates LLP

(57) ABSTRACT

A secondary battery includes a positive electrode, a negative electrode including a first negative electrode active material, a second negative electrode active material, and a normal temperature molten salt composition, and an electrolytic solution. The first negative electrode active material includes a first material including carbon, and the second negative electrode active material includes a second material including silicon.

16 Claims, 12 Drawing Sheets

NEGATIVE ELECTRODE FOR SECONDARY BATTERY, SECONDARY BATTERY, BATTERY PACK, ELECTRIC VEHICLE, ELECTRIC POWER STORAGE SYSTEM, ELECTRIC TOOL, AND ELECTRONIC DEVICE

CROSS REFERENCE TO RELATED APPLICATIONS

The present application is a continuation of PCT patent application no. PCT/JP2018/027613, filed on Jul. 24, 2018, which claims priority to Japanese patent application no. JP2017-142937 filed on Jul. 24, 2017, the entire contents of which are being incorporated herein by reference.

BACKGROUND

The present technology generally relates to a negative electrode to be used in a secondary battery, a secondary battery including the negative electrode, and a battery pack, an electric vehicle, an electric power storage system, an electric tool, and an electronic device, which include the secondary battery.

Various electronic devices such as mobile phones are widely used, and there is a demand for decreasing the size, decreasing the weight, and increasing the service life of the electronic devices. Hence, the development of secondary batteries, which are small and lightweight and capable of providing a high energy density as a power source, is underway.

It is investigated to apply secondary batteries not only to electronic devices but also to other applications. Examples thereof include battery packs detachably mounted on electronic devices, electric vehicles such as electric automobiles, electric power storage systems such as household electric power generators, and electric tools such as electric drills.

The secondary batteries include a positive electrode, a negative electrode, and an electrolytic solution, and the negative electrode contains a negative electrode active material involved in the charge and discharge reaction. Various investigations on the composition of the negative electrode have been carried out since the composition of the negative electrode greatly affects the battery characteristics of secondary batteries.

SUMMARY

The present technology generally relates to a negative electrode to be used in a secondary battery, a secondary battery including the negative electrode, and a battery pack, an electric vehicle, an electric power storage system, an electric tool, and an electronic device, which include the secondary battery.

Electronic devices and the like on which secondary batteries are mounted have been sophisticated and multi-functioned more and more. Accordingly, the frequency of use of electronic devices and the like have increased and the use environment of the electronic devices and the like have expanded. Hence, there is still room for improvement with regard to the battery characteristics of secondary batteries.

The present technology has been made in view of such a problem, and an object thereof is to provide a negative electrode for secondary battery capable of providing excellent battery characteristics, a secondary battery, a battery pack, an electric vehicle, an electric power storage system, an electric tool, and an electronic device.

According to an embodiment of the present disclosure, a negative electrode for secondary battery is provided. The negative electrode includes a first negative electrode active material, a second negative electrode active material, and a normal temperature molten salt composition.

The first negative electrode active material includes a first material including carbon, and wherein the second negative electrode active material includes a second material including silicon.

According to an embodiment of the present disclosure, a secondary battery is provided. The secondary battery includes a positive electrode, a negative electrode, and an electrolytic solution, and the negative electrode has a configuration similar to that of the negative electrode as described herein for secondary battery of the present technology.

A battery pack, an electric vehicle, an electric power storage system, an electric tool, and an electronic device of the present technology each include a secondary battery, and the secondary battery has a configuration similar to that of the secondary battery as described herein according to an embodiment of the present disclosure.

According to the negative electrode for secondary battery or secondary battery of the present technology, the negative electrode contains a normal temperature molten salt composition together with a first negative electrode active material containing a first material containing carbon and a second negative electrode active material containing a second material containing silicon. Hence, excellent battery characteristics can be attained. In addition, similar effects can be attained in each of the battery pack, the electric vehicle, the electric power storage system, the electric tool, and the electronic device of the present technology.

The effects described here are not necessarily limited and may be any effect described in the present technology.

DETAILED DESCRIPTION

As described herein, the present disclosure will be described based on examples with reference to the drawings, but the present disclosure is not to be considered limited to the examples, and various numerical values and materials in the examples are considered by way of example.

First, a negative electrode for secondary battery of a first embodiment of the present technology will be described.

The negative electrode for secondary battery (hereinafter simply referred to as "negative electrode") described here is, for example, a negative electrode in which lithium is used as an electrode reactant and is used in a secondary battery. This electrode reactant is a substance involved in the electrode reaction (so-called charge and discharge reaction). The kind of secondary battery is not particularly limited, but the secondary battery is, for example, a lithium ion secondary battery.

First, the configuration of the negative electrode will be described.

Figure 1:
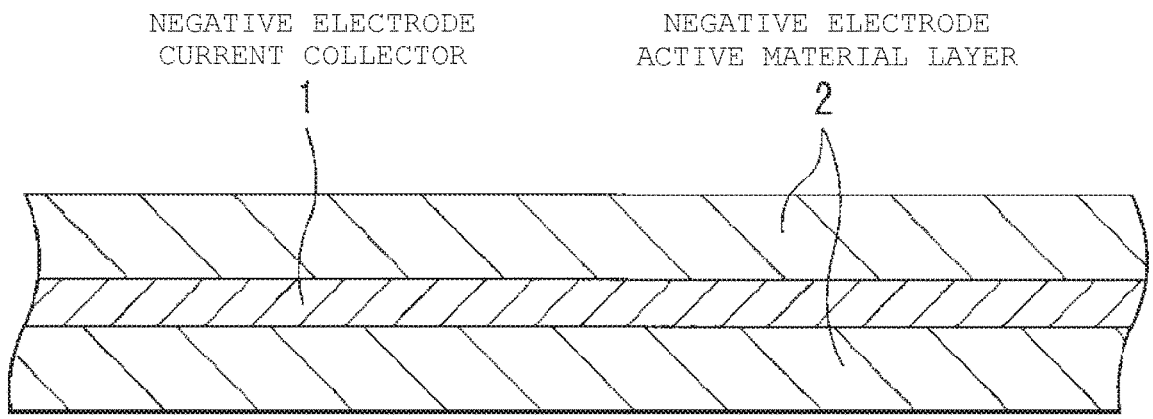
FIG. 1 is a sectional view illustrating the configuration of a negative electrode for secondary battery according to an embodiment of the present technology.
Figure 2:
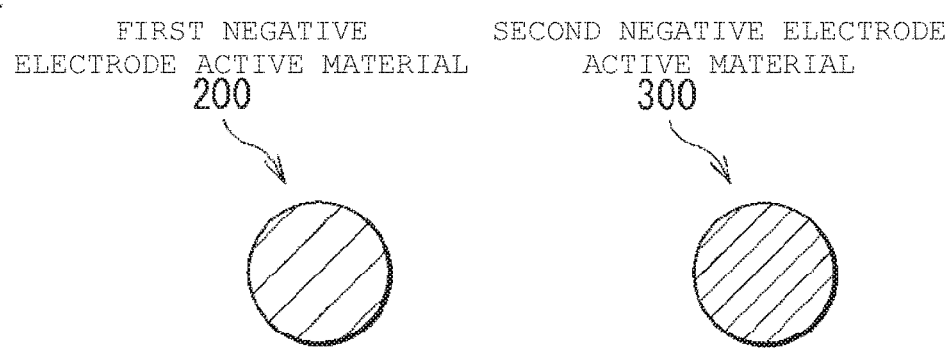
FIG. 2 is a sectional view illustrating the configuration of each of a first negative electrode active material and a second negative electrode active material according to an embodiment of the present technology.
Figure 3:
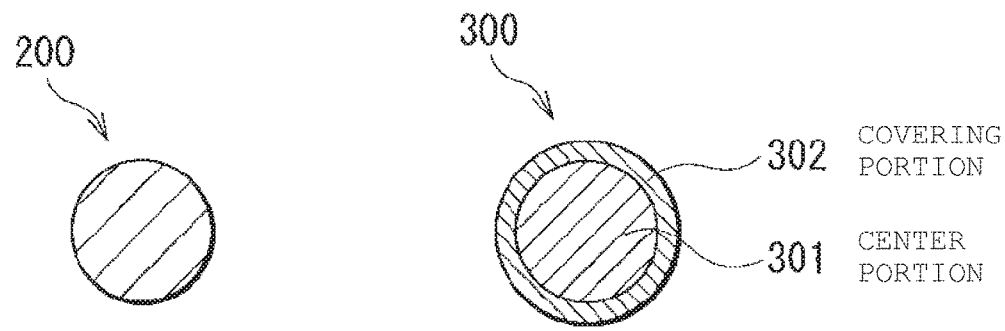
FIG. 3 is a sectional view illustrating the configuration of each of a first negative electrode active material and a second negative electrode active material according to an embodiment of the present technology.

FIG. 1 illustrates a sectional configuration of the negative electrode. FIGS. 2 and 3 each represent a sectional configuration of each of a first negative electrode active material 200 and a second negative electrode active material 300.

For example, as illustrated in FIG. 1, this negative electrode includes a negative electrode current collector 1 and a negative electrode active material layer 2 provided on the negative electrode current collector 1.

The negative electrode active material layer 2 may be provided only on one surface of the negative electrode current collector 1 or on both surfaces of the negative electrode current collector 1. FIG. 1 illustrates, for example, a case in which the negative electrode active material layer 2 is provided on both surfaces of the negative electrode current collector 1.

The negative electrode current collector 1 contains, for example, any one or two or more conductive materials. The kind of conductive material is not particularly limited, and the conductive material is, for example, metal materials such as copper, aluminum, nickel, and stainless steel and may be an alloy. This negative electrode current collector 1 may have a single layer or multiple layers.

It is preferable that the surface of the negative electrode current collector 1 be roughened. This is because the adhesive property of the negative electrode active material layer 2 with respect to the negative electrode current collector 1 is improved by utilizing the so-called anchor effect. In this case, the surface of the negative electrode current collector 1 may be roughened at least in a region facing the negative electrode active material layer 2. The surface roughening method is not particularly limited, and examples thereof include a method in which fine particles are formed by utilizing an electrolytic treatment. In the electrolytic treatment, fine particles are formed on the surface of the negative electrode current collector 1 in an electrolytic bath by an electrolytic method, and thus irregularities are provided on the surface of the negative electrode current collector 1. A copper foil fabricated by an electrolytic method is generally called an electrolytic copper foil.

The negative electrode active material layer 2 contains, for example, two kinds of negative electrode active materials (first negative electrode active material 200 and second negative electrode active material 300) capable of storing and releasing lithium and a normal temperature molten salt composition.

However, the negative electrode active material layer 2 may further contain any one or two or more other materials such as a negative electrode binder and a negative electrode conductive agent. This negative electrode active material layer 2 may have a single layer or multiple layers.

With regard to the configuration of each of the first negative electrode active material 200 and the second negative electrode active material 300, there are two aspects. FIG. 2 illustrates a sectional configuration of each of the first negative electrode active material 200 and the second negative electrode active material 300 in the first aspect, and FIG. 3 illustrates a sectional configuration of each of the first negative electrode active material 200 and the second negative electrode active material 300 in the second aspect.

The configuration of each of the first negative electrode active material 200 and the second negative electrode active material 300 in the first aspect is, for example, as follows.

The first negative electrode active material 200 is, for example, in the form of a plurality of particles as illustrated in FIG. 2. This first negative electrode active material 200 contains any one or two or more carbon-based materials. The carbon-based material is a general term for materials containing carbon as a constituent element.

The reason why the first negative electrode active material 200 contains a carbon-based material is because the carbon-based material hardly expands and contracts at the time of storage and release of lithium. The crystal structure of the carbon-based material thus hardly changes and a high energy density is thus stably attained. Moreover, the carbon-based material also functions as a negative electrode conductive agent and thus the conductivity of the negative electrode active material layer 2 is improved.

The kind of carbon-based material is not particularly limited, but the carbon-based material is, for example, carbon materials. The carbon material is a general term for materials containing only carbon as a constituent element. However, the purity of the carbon material is not necessarily limited to 100%, and thus the carbon material may contain different elements in trace amounts. The different elements are any one or two or more elements other than carbon.

Specifically, examples of the carbon material include graphitizable carbon, non-graphitizable carbon, and graphite. However, the spacing of (002) plane of non-graphitizable carbon is preferably 0.37 nm or more and the spacing of (002) plane of graphite is preferably 0.34 nm or less.

More specific examples of the carbon material include pyrolytic carbons, cokes, glassy carbon fibers, organic polymer compound fired bodies, activated carbon, and carbon blacks. The cokes include pitch coke, needle coke, petroleum coke and the like. An organic polymer compound fired body is a fired product obtained by firing (carbonizing) a polymer compound such as a phenol resin and a furan resin at a proper temperature. In addition to these, the carbon material may be low crystalline carbon subjected to a heat treatment at a temperature of about 1000° C. or less or amorphous carbon. The shape of the carbon material may be any of a fibrous shape, a spherical shape, a granular shape, or a scaly shape.

The second negative electrode active material 300 is, for example, in the form of a plurality of particles as illustrated in FIG. 2. This second negative electrode active material 300 contains any one or two or more silicon-based materials. The silicon-based material is a general term for materials containing silicon as a constituent element.

The reason why the second negative electrode active material 300 contains a silicon-based material is because the silicon-based material has excellent ability to store and release lithium and thus a high energy density is attained.

The kind of silicon-based material is not particularly limited. For this reason, the silicon-based material may be elemental silicon, an alloy of silicon, a compound of silicon, two or more of these, or a material at least a part of which has phases composed of one or two or more of these.

The simple substance described here is a simple substance in a general sense and may contain impurities in trace amounts. In other words, the purity of the simple substance is not necessarily limited to 100%. In addition, the alloy may be a material composed of two or more metal elements or a material containing one or two or more metal elements and one or two or more metalloid elements and may contain one or two or more metal elements and one or two or more nonmetallic elements. The definitions of the simple substance and alloy described here are the same in the following. The structure of the silicon-based material is, for example, a solid solution, a eutectic (eutectic mixture), an intermetallic compound, and a material in which two or more of these coexist.

The alloy of silicon contains, for example, any one or two or more of tin, nickel, copper, iron, cobalt, manganese, zinc, indium, silver, titanium, germanium, bismuth, antimony, chromium, or the like as constituent elements other than silicon. The compound of silicon contains, for example, any one or two or more of carbon, oxygen or the like as constituent elements other than silicon. The compound of silicon may contain, for example, any one or two or more of a series of elements described in the alloy of silicon as constituent elements other than silicon.

Specific examples of the alloy and compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v≤2$), and LiSiO. Here, v in $SiO_v$ may be $0.2<v<1.4$.

Here, the reason why the negative electrode active material layer 2 contains both the first negative electrode active material 200 (carbon-based material) and the second negative electrode active material 300 (silicon-based material) is because a high theoretical capacity (namely, battery capacity) is attained and the negative electrode hardly expands and contracts at the time of charge and discharge.

In detail, the silicon-based material has an advantage of having a high theoretical capacity but has a concern of being likely to violently expand and contract at the time of charge and discharge. In contrast, the carbon-based material has a concern of having a low theoretical capacity but has an advantage of being less likely to expand and contract at the time of charge and discharge. Hence, expansion and contraction of the negative electrode at the time of charge and discharge is suppressed while a high theoretical capacity is ensured by concurrent use of a carbon-based material and a metal-based material.

The mixing ratio (weight ratio) between the first negative electrode active material 200 and the second negative electrode active material 300 is not particularly limited. Specifically, the proportion (mixing proportion) of the weight of the second negative electrode active material 300 to the sum of the weight of the first negative electrode active material 200 and the weight of the second negative electrode active material 300 is 1% by weight to 99% by weight. This is because the advantage by concurrent use of the first negative electrode active material 200 and the second negative electrode active material 300 is attained without depending on the mixing ratio.

Among these, the mixing proportion is preferably 50% by weight or less and more preferably 30% by weight or less. This is because the content of silicon-based material, which is the main factor to cause the expansion and contraction of negative electrode decreases and thus the expansion and contraction of negative electrode is sufficiently suppressed.

The configuration of each of the first negative electrode active material 200 and the second negative electrode active material 300 in the second aspect is, for example, as follows.

The configuration of the first negative electrode active material 200 is, for example, similar to the configuration of the first negative electrode active material 200 in the first aspect described above.

For example, as illustrated in FIG. 3, the second negative electrode active material 300 includes a center portion 301 and a covering portion 302 provided on the surface of the center portion 301.

The center portion 301 is, for example, in the form of particles and contains a silicon-based material. The details of the silicon-based material are as described above. In other words, the center portion 301 has a configuration similar to that of the second negative electrode active material 300 in the first aspect.

The covering portion 302 is a protective layer which protects the center portion 301 by covering the surface of the center portion 301. The covering portion 302 is provided on a part of the surface of the center portion 301 or on the entire surface of the center portion 301. For this reason, the covering portion 302 may cover the entire surface of the center portion 301 or only a part of the surface of the center portion 301. Of course, in the latter case, a plurality of covering portions 302 which are physically separated from each other may be present on the surface of the center portion 301.

This covering portion 302 contains any one or two or more covering materials. Examples of the covering material include a polyacrylate salt, polyacrylic acid, polyvinylidene fluoride, and polyvinylpyrrolidone.

The reason why the second negative electrode active material 300 includes the covering portion 302 is because the center portion 301 is protected by the covering portion 302 and thus the electrolytic solution is hardly decomposed on the surface of the center portion 301 containing a highly reactive silicon-based material. In addition, the covering portion 302 also functions as a binder and thus the second negative electrode active materials 300 are easily bound to each other with the covering portion 302 interposed therebetween. In this case, if the negative electrode active material layer 2 contains a negative electrode binder, the binding property of the second negative electrode active material 300 is further improved.

The reason why the covering portion 302 contains the covering material is because the coating film formed by the covering material performs a function similar to that of a so-called SEI (Solid Electrolyte Interphase) film. Hence, even when the covering portion 302 is provided on the surface of the center portion 301, the surface of the center portion 301 is protected by the covering portion 302 without hindering the storage and release of lithium at the center portion 301. In this case, the SEI film is hardly decomposed by the presence of the coating film formed of the covering material, particularly at the end of discharge. Hence, the protected state of the center portion 301 by the covering portion 302 is likely to be maintained even at the end of discharge.

The kind of polyacrylate salt is not particularly limited, and the polyacrylate salt is, for example, metal salts and onium salts. However, the polyacrylate salt described here is not limited to a compound in which all the carboxyl groups (—COOH) contained in polyacrylic acid form a salt but may be a compound in which a part of carboxyl groups contained in polyacrylic acid forms a salt. In other words, the latter polyacrylate salt may contain one or two or more unreacted groups (carboxyl groups).

The kind of metal ion contained in the metal salt is not particularly limited, but the metal ion is, for example, an alkali metal ion and more specifically a lithium ion, a sodium ion, and a potassium ion. The kind of onium ion contained in the onium salt is not particularly limited, but the onium ion is, for example, an ammonium ion and a phosphonium ion. Specific examples of the polyacrylate salt include sodium polyacrylate and potassium polyacrylate.

The polyacrylate salt may contain only a metal ion, only an onium ion, or both a metal ion and an onium ion in one molecule.

The proportion (occupation proportion) of the weight of the covering portion 302 to the sum of the weight of the center portion 301 and the weight of the covering portion 302 is not particularly limited. This occupation proportion is calculated by a calculation formula:

occupation proportion (% by weight)=[weight of covering portion 302/(weight of center portion 301+weight of covering portion 302)]×100. In this calculation formula, the weight of the former (numerator) covering portion 302 is the weight of the covering material and the weight of the latter (denominator) covering portion 302 is also the weight of the covering material. However, the occupation proportion is preferably not too great. This is because the ion conductivity on the surface of the center portion 301 is ensured as the amount of the center portion 301 covered with the covering portion 302 is properly controlled. Hence, even when the surface of the center portion 301 is covered with the covering portion 302, lithium is easily stored and released at the center portion 301.

The thickness of the covering portion 302 is not particularly limited but is, for example, preferably about less than 1 µm. This is because storage and release of lithium at the center portion 301 is more hardly inhibited.

The thickness of the covering portion 302 described here is a so-called average thickness and is calculated, for example, by the following procedure. First, a cross section of the second negative electrode active material 300 (center portion 301 and covering portion 302) is observed under a microscope such as a field emission scanning electron microscope (FE-SEM). In this case, the magnification is adjusted so that about ⅓ of the entire image of the second negative electrode active material 300 can be observed. More specifically, the magnification is set to about 2000 times in a case in which the average particle diameter (median diameter D50) of the second negative electrode active material 300 is about 20 µm. Subsequently, the thickness of the covering portion 302 is measured at five positions located at equal intervals based on the observation result (micrograph). This interval is, for example, about 0.5 µm. Finally, the average value of the thicknesses measured at five positions is calculated.

The coverage of the covering portion 302, namely, the proportion of the surface of the center portion 301 covered with the covering portion 302 is not particularly limited but is, for example, preferably 50% or more. This is because the effect of protecting the center portion 301 by the covering portion 302 is sufficiently exerted.

The coverage of the covering portion 302 described here is a so-called average coverage and is calculated, for example, by the following procedure. First, a cross section of the second negative electrode active material 300 (center portion 301 and covering portion 302) is observed under a microscope such as a field emission scanning electron microscope (FE-SEM). In this case, the magnification is adjusted so that about ⅓ of the entire image of the second negative electrode active material 300 can be observed and the cross section of the covering portion 302 is observed at arbitrary 10 positions (10 visual fields).

The details of the magnification are similar to those in the case of, for example, calculating the average thickness of the covering portion 302. Subsequently, the coverage is calculated for every visual field based on the observation result (micrograph). In this case, a length L1 of the outer edge (outline) of the entire image of the center portion 301 is measured, a length L2 of the outer edge of the part covered with the covering portion 302 at the center portion 301 is measured, and then the coverage is calculated by (L2/L1)× 100. Finally, the average value of the coverages calculated in 10 visual fields is calculated.

However, the second negative electrode active material 300 may not include the covering portion 302 in a case in which the normal temperature molten salt composition contains a copolymer to be described later. This is because the copolymer covers the surface of the center portion 301 and thus the copolymer performs a function similar to that of the covering portion 302. The details of the copolymer will be described later.

The normal temperature molten salt composition is contained in the negative electrode active material layer 2 together with the first negative electrode active material 200 and second negative electrode active material 300 described above. For this reason, the normal temperature molten salt composition is dispersed in the negative electrode active material layer 2 in the same manner as the first negative electrode active material 200 and the second negative electrode active material 300.

However, the normal temperature molten salt composition exhibits high affinity for silicon-based materials and is thus distributed in the negative electrode active material layer 2 so as to be present in the vicinity of the second negative electrode active material 300 (silicon-based material) in a more amount than in the vicinity of the first negative electrode active material 200 (carbon-based material).

In other words, when the amount of normal temperature molten salt composition present in the vicinity of the first negative electrode active material 200 and the amount of normal temperature molten salt composition present in the vicinity of the second negative electrode active material 300 are compared with each other, the amount of normal temperature molten salt composition present in the vicinity of the second negative electrode active material 300 is greater than the amount of normal temperature molten salt composition present in the vicinity of the first negative electrode active material 200.

The reason why the negative electrode active material layer 2 contains a normal temperature molten salt composition is because the normal temperature molten salt composition is more likely to be present in the vicinity of the second negative electrode active material 300 than in the vicinity of the first negative electrode active material 200 as described above in the mixed system in which the negative electrode active material layer 2 contains both the first negative electrode active material 200 (carbon-based material) and the second negative electrode active material 300 (silicon-based material). In this case, the ion conductivity is preferentially improved in the vicinity of the second negative electrode active material 300, and thus lithium is likely to be stored and released in the second negative electrode active material 300. Hence, in the mixed system in which a carbon-based material and a silicon-based material are concurrently used, the advantages of the silicon-based material are enhanced while the above-described concerns on the silicon-based material are suppressed. Consequently, the charge and discharge reaction is likely to smoothly and stably proceed in the negative electrode, and the negative electrode in the charged state is thermally stable even when being exposed to a high temperature environment.

The normal temperature molten salt composition contains, for example, either or both of a normal temperature molten salt and a copolymer. The kind of normal temperature molten salt may be only one kind or two or more kinds. In the same manner, the kind of copolymer may be only one kind or two or more kinds.

The normal temperature molten salt is a so-called ionic liquid and exhibits excellent flame retardancy and high ion conductivity. The copolymer is a copolymer of a normal temperature molten salt and a polymer compound. The kind of normal temperature molten salt to be copolymerized with a polymer compound may be only one kind or two or more kinds. In the same manner, the kind of polymer compound to be copolymerized with the normal temperature molten salt may be only one kind or two or more kinds.

The normal temperature molten salt contains one or two or more kinds of cations and one or two or more kinds of anions.

The kind of cation is not particularly limited, and examples thereof include an ammonium cation, a phosphonium cation, a sulfonium cation, an imidazolium cation, a pyridinium cation, and a pyrrolidinium cation. Among these, a quaternary ammonium cation, a quaternary phosphonium cation, a tertiary sulfonium cation, an imidazolium cation, a pyridinium cation, and a pyrrolidinium cation are preferable. This is because excellent thermal stability is attained and a normal temperature molten salt can be easily synthesized.

The quaternary ammonium cation is represented by $NR_4^+$. R is any one of a monovalent aliphatic hydrocarbon group, a monovalent aromatic hydrocarbon group, a monovalent heterocyclic group, or the like. However, four Rs may be the same group as each other or different groups from each other. Of course, only some of the four Rs may be the same group as each other.

The quaternary phosphonium cation is represented by $PR_4^+$. The details of four Rs are similar to those in the case described on the quaternary ammonium cation.

The tertiary sulfonium cation is represented by $SR_3^+$. The details of three Rs are similar to those in the case described on the quaternary ammonium cation.

The imidazolium cation is represented by $C_3H_3N_2R_2^+$. The details of two Rs are similar to those in the case described on the quaternary ammonium cation.

The imidazolium cation is, for example, 1-ethyl-3-methylimidazolium ion.

The pyridinium cation is represented by $C_5H_5NR_2^+$. The details of two Rs are similar to those in the case described on the quaternary ammonium cation.

The pyrrolidinium cation is represented by $C_4H_8NR_2^+$. The details of two Rs are similar to those in the case described on the quaternary ammonium cation.

The kind of anion is not particularly limited, but examples thereof include a bis(trifluoromethanesulfonyl)imide anion ($CF_3$—$S(=O)_2$—$N^-$—$S(=O)_2$—$CF_3$), a bis(fluorosulfonyl)imide anion (F—$S(=O)_2$—$N^-$—$S(=O)_2$—F), a tetrafluoroborate anion ($BF_4^-$), a hexafluorophosphate anion ($PF_6^-$), and a halide anion, and the halide anion is, for example, a chloride anion ($Cl^-$). Among these, a bis(trifluoromethanesulfonyl)imide anion, a bis(fluorosulfonyl)imide anion, a tetrafluoroborate anion, a hexafluorophosphate anion, and a chloride anion are preferable. This is because excellent thermal stability is attained and a normal temperature molten salt can be easily synthesized.

The copolymer is, for example, a graft copolymer obtained by grafting a normal temperature molten salt to a polymer compound. In this graft copolymer, for example, one or two or more normal temperature molten salts are introduced into a polymer compound as a side chain.

The kind of polymer compound is not particularly limited but is, for example, similar to the kind of the negative electrode binder (polymer compound) to be described later. This is because excellent thermal stability is attained and thus the thermal stability of the negative electrode binder is further improved. Examples of the polymer compound include a polyacrylate salt, polyacrylic acid, polyimide, polyamic acid, polyamideimide, polytetrafluoroethylene, and polyvinylidene fluoride. Among these, a polyacrylate salt, polyacrylic acid, polyimide, polyvinylidene fluoride, and the like are preferable.

In particular, the normal temperature molten salt composition preferably contains any one or two or more reactive groups which are likely to react with the second negative electrode active material 300 (silicon-based material). In other words, in a case in which the normal temperature molten salt composition contains a normal temperature molten salt, the normal temperature molten salt preferably contains a reactive group. In addition, in a case in which the normal temperature molten salt composition contains a copolymer, the normal temperature molten salt may contain a reactive group, the polymer compound may contain a reactive group, or both of these may contain a reactive group. This is because the normal temperature molten salt composition reacts with the silicon-based material through the reactive group, and thus the normal temperature molten salt composition is fixed to the second negative electrode active material 300. Hence, the normal temperature molten salt composition is more likely to be present in the vicinity of the second negative electrode active material 300.

The kind of reactive group is not particularly limited as long as it is a functional group which easily reacts with a silicon-based material, and examples thereof include an alkoxy group, a hydroxy group, an acryloyl group, and a methacryloyl group. This is because the normal temperature molten salt composition is likely to sufficiently react with the silicon-based material.

The content of the normal temperature molten salt composition in the negative electrode active material layer 2 is not particularly limited and is, for example, 0.01% by weight to 5% by weight. This is because the content of each of the first negative electrode active material 200 and the second negative electrode active material 300 is ensured and thus the advantages due to the normal temperature molten salt composition are attained while a high battery capacity is maintained.

Other materials include, for example, metal salts and, silane coupling agents, and the like in addition to the negative electrode binder and negative electrode conductive agent above described.

The negative electrode binder mainly binds the first negative electrode active material 200, the second negative electrode active material 300, and the like. The negative electrode binder contains, for example, any one or two or more of synthetic rubber, polymer compounds, or the like. Examples of the synthetic rubber include styrene butadiene-based rubber, fluorine-based rubber, and ethylene propylene diene. Examples of the polymer compound include polyvinylidene fluoride, a polyacrylate salt, polyacrylic acid, and polyimide. Among these, polyvinylidene fluoride, styrene-butadiene rubber, polyimide, a polyacrylate salt, and polyacrylic acid are preferable.

The negative electrode conductive agent mainly improves the electronic conductivity of the negative electrode active material layer 2. The negative electrode conductive agent contains, for example, any one or two or more of conductive materials such as carbon materials. Examples of the carbon materials include graphite, carbon black, acetylene black, ketjen black, carbon fiber, and carbon nanotube. However, the negative electrode conductive agent is not limited to a carbon material as long as it is a conductive material and may be a metal material, a conductive polymer, and the like.

The metal salt mainly improves the ion conductivity of the normal temperature molten salt composition and the ion conductivity of the negative electrode active material layer 2. The kind of metal salt is not particularly limited, but among others, a salt of an electrode reactant is preferable. In other words, in a case in which lithium is used as an electrode reactant, the metal salt is preferably a lithium salt. The kind of lithium salt is not particularly limited as long as it is any one or two or more of salts containing a lithium ion as a cation.

The details of the lithium salt are, for example, similar to the details of the electrolyte salt to be described later.

The silane coupling agent mainly exhibits high affinity for the negative electrode binder and thus binds the first negative electrode active material 200 and the second negative electrode active material 300 to each other. In addition to the first negative electrode active material 200 and the second negative electrode active material 300, the silane coupling agent binds the negative electrode current collector 1, the negative electrode conductive agent, and the like.

The kind of silane coupling agent is not particularly limited as long as it is any one or two or more of materials exhibiting high affinity for the negative electrode binder. Specific examples of the silane coupling agent include a silane coupling agent containing an amino group, a silane coupling agent containing sulfur as a constituent element, and a silane coupling agent containing fluorine as a constituent element. Examples of the silane coupling agent containing an amino group include 3-aminopropylmethyldiethoxysilane, 3-aminopropyltriethoxysilane, and N,N'-bis[3-trimethoxysilyl]propylethylenediamine. Examples of the silane coupling agent containing sulfur as a constituent element include bis[3-(triethoxysilyl)propyl]tetrasulfide, bis[3-(triethoxysilyl)propyl]disulfide, 3-mercaptopropyltrimethoxysilane, and 3-mercaptopropylmethyldimethoxysilane. Examples of the silane coupling agent containing fluorine as a constituent element include (heptadecafluoro-1,1,2,2-tetrahydrodecyl)-trimethoxysilane, (heptadecafluoro-1,1,2,2-tetrahydrodecyl)-tris(dimethylamino)silane, and (heptadecafluoro-1,1,2,2-tetrahydrodecyl)-triethoxysilane.

The negative electrode active material layer 2 may contain, for example, any one or two or more of other negative electrode active materials together with the first negative electrode active material 200 and second negative electrode active material 300 described above.

Other negative electrode active materials are, for example, metal-based materials. The "metal-based material" is a general term for materials containing any one or two or more of metal elements and metalloid elements as constituent elements. This is because a high energy density is attained.

However, the silicon-based material described above is excluded from the metal-based material described here. It is.

The metal-based material may be a single metal, an alloy, a compound, two or more of these, or a material at least a part of which has phases composed of one or two or more of these. The structure of metal-based material is, for example, a solid solution, a eutectic (eutectic mixture), an intermetallic compound, and a material in which two or more of these coexist.

The metal element is, for example, a metal element capable of forming an alloy with lithium, and the metalloid element is, for example, a metalloid element capable of forming an alloy with lithium. Specific examples of the metal element and the metalloid element include magnesium (Mg), boron (B), aluminum (Al), gallium (Ga), indium (In), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

Among others, tin is preferable. This is because the ability to store and release lithium is excellent and thus a significantly high energy density is attained.

A material containing tin as a constituent element (hereinafter simply referred to as "tin-based material") may be elemental tin, an alloy of tin, a compound of tin, two or more of these, or a material at least a part of which has phases composed of one or two or more of these.

The alloy of tin contains any one or two or more of silicon, nickel, copper, iron, cobalt, manganese, zinc, indium, silver, titanium, germanium, bismuth, antimony, chromium, or the like, for example, as constituent elements other than tin. The compound of tin contains any one or two or more of carbon, oxygen or the like, for example, as constituent elements other than tin. The compound of tin may contain any one or two or more of a series of elements described in the alloy of tin, for example, as constituent elements other than tin.

Specific examples of the alloy and compound of tin include $SnO_w(0<w\leq2)$, $SnSiO_3$, $LiSnO$, and $Mg_2Sn$.

In particular, the tin-based material is preferably, for example, a material (hereinafter referred to as "tin-containing material") containing a second constituent element and a third constituent element together with tin as the first constituent element. The second constituent element is, for example, any one or two or more of cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, silicon, or the like. The third constituent element is, for example, any one or two or more of boron, carbon, aluminum, phosphorus, or the like. This is because a high battery capacity, excellent cycle characteristics and the like are attained.

Among these, the tin-containing material is preferably a material (hereinafter referred to as "tin cobalt carbon-containing material") containing tin, cobalt, and carbon as constituent elements. In this tin cobalt carbon-containing material, for example, the carbon content is 9.9% by mass to 29.7% by mass and the proportion (Co/(Sn+Co)) of tin and cobalt content is 20% by mass to 70% by mass. This is because a high energy density is attained.

It is preferable that the tin cobalt carbon-containing material have a phase containing tin, cobalt, and carbon and the phase be low crystalline or amorphous. This phase is a phase (reaction phase) capable of reacting with lithium, and thus excellent characteristics are attained by the presence of this reaction phase. It is preferable that the half value width (diffraction angle 2θ) of the diffraction peak of this reaction phase attained by X-ray diffraction be 1° or more when CuKα ray is used as the specific X-ray and the insertion speed is set to 1°/min. This is because lithium is more smoothly stored and released and the reactivity thereof with the electrolytic solution decreases. There is also a case in which the tin cobalt carbon-containing material has a phase containing a simple substance or a part of the respective constituent elements in addition to a low crystalline or amorphous phase.

It can be easily judged whether or not the diffraction peak attained by X-ray diffraction is a diffraction peak corresponding to a reaction phase capable of reacting with lithium if the X-ray diffraction charts before and after the electrochemical reaction with lithium are compared with each other. For example, if the position of the diffraction peak changes after the electrochemical reaction with lithium, it is a diffraction peak corresponding to a reaction phase capable of reacting with lithium. In this case, for example, a diffraction peak attributed to a low crystalline or amorphous reaction phase is detected in a range of 2θ=20° to 50°. It is considered that this reaction phase contains, for example, the series of constituent elements described above and is low crystallized or amorphized mainly by the presence of carbon.

In the tin cobalt carbon-containing material, it is preferable that at least a part of carbon which is a constituent element is bonded to a metal element or metalloid element which is another constituent element. This is because aggregation of tin and the like or crystallization of tin is suppressed. The bonding state of elements can be confirmed by, for example, X-ray photoelectron spectroscopy (XPS). In a commercially available apparatus, for example, Al—Kα rays or Mg—Kα rays are used as the soft X-ray. In a case in which at least a part of carbon is bonded to a metal element, a metalloid element or the like, the peak of the synthetic wave at the carbon 1s orbitals (C1s) appears in an energy region lower than 284.5 eV. The energy calibration is performed so that the peak at the gold atom 4f orbitals (Au4f) is attained at 84.0 eV. At this time, surface-contaminated carbon is usually present on the surface of a substance, and thus the C1s peak energy attributed to the surface-contaminated carbon is set to 284.8 eV, and this peak is used as an energy reference.

In XPS measurement, the waveform of the C1s peak includes the peak attributed to the surface-contaminated carbon and the peak attributed to the carbon in the tin cobalt carbon-containing material. For this reason, both peaks are separated from each other by being analyzed using, for example, commercially available software. In the analysis of waveform, the position of the main peak present on the lowest bound energy side is used as the energy reference (284.8 eV).

This tin cobalt carbon-containing material is not limited to a material of which the constituent elements are only tin, cobalt, and carbon. This tin cobalt carbon-containing material may further contain, for example, any one or two or more of silicon, iron, nickel, chromium, indium, niobium, germanium, titanium, molybdenum, aluminum, phosphorus, gallium, bismuth or the like as a constituent element in addition to tin, cobalt, and carbon.

In addition to the tin cobalt carbon-containing material, a material (hereinafter referred to as "tin cobalt iron carbon-containing material") containing tin, cobalt, iron, and carbon as constituent elements is also preferable. The composition of this tin cobalt iron carbon-containing material is arbitrary. As an example, in a case in which the iron content is set to be low, the carbon content is 9.9% by mass to 29.7% by mass, the iron content is 0.3% by mass to 5.9% by mass, and the proportion (Co/(Sn+Co)) of tin and cobalt content is 30% by mass to 70% by mass. In addition, in a case in which the iron content is set to be high, the carbon content is 11.9% by mass to 29.7% by mass, the proportion ((Co+Fe)/(Sn+Co+Fe)) of tin, cobalt, and iron content is 26.4% by mass to 48.5% by mass, and the proportion (Co/(Co+Fe)) of cobalt and iron content is 9.9% by mass to 79.5% by mass. This is because a high energy density is attained in such a composition range. The physical properties (half value width and the like) of the tin cobalt iron carbon-containing material are similar to the physical properties of the tin cobalt carbon-containing material described above.

In addition, the other negative electrode active materials are, for example, a metal oxide and a polymer compound. Examples of the metal oxide include iron oxide, ruthenium oxide, and molybdenum oxide. Examples of the polymer compound include polyacetylene, polyaniline, and polypyrrole.

Next, a method for manufacturing the negative electrode will be described. This negative electrode is manufactured, for example, by the following procedure.

First, a negative electrode mixture is prepared.

In the case of using the first negative electrode active material 200 and the second negative electrode active material 300 in the first aspect, a negative electrode active material containing the first negative electrode active material 200 and the second negative electrode active material 300, a normal temperature molten salt composition, and, if necessary, a negative electrode binder, a negative electrode conductive agent and the like are mixed together to prepare a negative electrode mixture.

In the case of using the first negative electrode active material 200 and the second negative electrode active material 300 in the second aspect, the second negative electrode active material 300 is prepared by the following procedure and then a negative electrode mixture is obtained.

In this case, the center portion 301 containing a silicon-based material and a covering material containing any one or two or more of a polyacrylate salt, polyacrylic acid, polyvinylidene fluoride, or polyvinylpyrrolidone are first mixed together.

As the covering material, a dissolved product or a non-dissolved product may be used. This dissolved product is, for example, a solution in which the covering material is dissolved in pure water or the like. More specifically, this dissolved product is, for example, an aqueous solution of a polyacrylate salt or an aqueous solution of polyacrylic acid.

Subsequently, the mixture is put into a solvent and then the solvent is stirred. The kind of solvent is not particularly limited as long as it is any one or two or more of arbitrary solvents, and the solvent is, for example, an aqueous solvent and an organic solvent which are able to dissolve the covering material. The aqueous solvent is, for example, pure water, and the organic solvent is, for example, N-methyl-2-pyrrolidone. In the case of stirring the solvent, for example, a stirring apparatus such as a stirrer may be used. The conditions such as stirring time can be arbitrarily set. In this manner, the center portion 301 is dispersed in the solvent, the covering material is dissolved in the solvent, and thus a dispersion containing the center portion 301 and the covering material is prepared.

Subsequently, the second negative electrode active material 300 is separated from the dispersion. The separation method is not particularly limited, and for example, the filtered product is recovered by filtering the dispersion. Thereafter, the filtered product may be dried. The conditions such as drying temperature and drying time can be arbitrarily set. In the dispersion, the covering portion 302 containing the covering material is formed on the surface of the center portion 301, and thus the second negative electrode active material 300 containing the center portion 301 and the covering portion 302 is formed. Hence, the second negative electrode active material 300 that is a filtered product is obtained by filtering the dispersion.

The dispersion may be sprayed using a spray drying apparatus and then dried instead of being filtered. In this case as well, the covering portion 302 is formed on the surface of the center portion 301 and thus the second negative electrode active material 300 is obtained.

Finally, the negative electrode active material containing the first negative electrode active material 200 and the second negative electrode active material 300 (center portion 301 and covering portion 302), the normal temperature molten salt composition, and, if necessary, a negative electrode binder, a negative electrode conductive agent and the like are mixed together to prepare a negative electrode mixture.

As described above, the covering portion 302 may not be formed in a case in which the copolymer is used as the normal temperature molten salt composition.

Subsequently, the negative electrode mixture is put into a solvent, and then the solvent is stirred to prepare a negative electrode mixture slurry in the form of paste. The kind of solvent is not particularly limited as long as it is any one or two or more of arbitrary solvents, and the solvent is, for example, an aqueous solvent and an organic solvent. The details of the aqueous solvent and organic solvent are as described above.

Finally, the negative electrode mixture slurry is applied to both surfaces of the negative electrode current collector 1 and then dried to form the negative electrode active material layer 2. Thereafter, the negative electrode active material layer 2 is compression-molded using a roll press or the like, if necessary. In this case, the negative electrode active material layer 2 may be heated, or compression molding may be repeated plural times.

A negative electrode including the negative electrode current collector 1 and the negative electrode active material layer 2 is thus completed.

According to the negative electrode of the present embodiment, the negative electrode active material layer 2 contains the normal temperature molten salt composition together with the first negative electrode active material (carbon-based material) and the second negative electrode active material 300 (silicon-based material). In this case, in the mixed system of a carbon-based material and a silicon-based material, the normal temperature molten salt composition is more likely to be present in the vicinity of the silicon-based material than in the vicinity of the carbon-based material as described above. Hence, ion conductivity is preferentially improved in the vicinity of the silicon-based material, and thus lithium is likely to be stored and released in the silicon-based material. Consequently, the charge and discharge reaction is likely to smoothly and stably proceed in the negative electrode, the negative electrode in the charged state is thermally stable even when being exposed to a high temperature environment, and thus excellent battery characteristics can be attained.

In particular, if the normal temperature molten salt composition contains either or both of a normal temperature molten salt and a copolymer, the normal temperature molten salt composition is likely to be sufficiently present in the vicinity of the silicon-based material and a still higher effect can be attained. In this case, if the normal temperature molten salt composition contains a copolymer, excellent thermal stability is attained, the thermal stability of the negative electrode binder is further improved, and a higher effect can be thus attained. In addition, if the normal temperature molten salt contains a quaternary ammonium cation and the like as a cation and the polymer compound contains a polyacrylate salt and the like, the normal temperature molten salt composition is more likely to be present in the vicinity of the silicon-based material and a still higher effect can be thus attained.

In addition, if the normal temperature molten salt contains a bis(trifluoromethanesulfonyl)imide anion as an anion, the normal temperature molten salt composition is more likely to be present in the vicinity of the silicon-based material and a higher effect can be thus attained.

Moreover, if the normal temperature molten salt composition contains a reactive group such as an alkoxy group, the normal temperature molten salt composition is likely to react with the silicon-based material through the reactive group. Hence, the normal temperature molten salt composition is more likely to be present in the vicinity of the silicon-based material and a higher effect can be thus attained.

Moreover, if the negative electrode active material layer 2 contains a metal salt, the ion conductivity of the negative electrode active material layer 2 and the like is improved and a higher effect can be thus attained.

In addition, if the negative electrode active material layer 2 contains a negative electrode binder and the negative electrode binder contains polyvinylidene fluoride and the like, the first negative electrode active material 200 and the second negative electrode active material 300 are sufficiently bound to each other with the negative electrode binder interposed therebetween. Consequently, lithium is likely to be smoothly and sufficiently stored and released in each of the first negative electrode active material 200 and the second negative electrode active material 300 and a higher effect can be thus attained.

Next, a negative electrode for secondary battery of a second embodiment of the present technology will be described. In the following description, the constituent elements of the negative electrode of the first embodiment already described are referred to as needed.

The negative electrode described here has a configuration similar to that of the negative electrode (second aspect illustrated in FIG. 3) of the first embodiment described above except that the normal temperature molten salt composition is contained in the covering portion 302 instead of being dispersed in the negative electrode active material layer 2.

Specifically, as illustrated in FIG. 3, the second negative electrode active material 300 includes a center portion 301 and a covering portion 302, and the covering portion 302 contains a normal temperature molten salt composition together with a covering material. The details of each of the covering material and the normal temperature molten salt composition are as described above.

The reason why the covering portion 302 contains the normal temperature molten salt composition is because the normal temperature molten salt composition is likely to be present in the vicinity of the silicon-based material in the same manner as in the first embodiment in which the negative electrode active material layer 2 contains a normal temperature molten salt composition. In this case, particularly the covering portion 302 containing the normal temperature molten salt composition is fixed onto the surface of the center portion 301 containing a silicon-based material, and thus the normal temperature molten salt composition is firmly fixed to the silicon-based material. Hence, the normal temperature molten salt composition is likely to be present in the vicinity of the silicon-based material in a more amount than in the vicinity of the carbon-based material and this state is likely to be maintained even when charge and discharge is repeated.

In this case, the normal temperature molten salt composition is preferably bonded to the silicon-based material. More specifically, the normal temperature molten salt composition is preferably bonded to the silicon-based material through the above-described reactive group. This is because the normal temperature molten salt composition is more firmly fixed to the silicon-based material and thus a state in which the normal temperature molten salt composition is present in the vicinity of the silicon-based material in a more amount is more likely to be maintained.

Moreover, the normal temperature molten salt composition is preferably bonded to the negative electrode binder.

More specifically, the normal temperature molten salt composition is preferably bonded to the negative electrode binder through the above-described reactive group. This is because a state in which the normal temperature molten salt composition is fixed onto the surface of the silicon-based material is more likely to be maintained as the normal temperature molten salt composition is bonded to the negative electrode binder.

The covering portion 302 may contain a metal salt. The details of the metal salt are as described above. This is because advantages similar to those in the first embodiment in which the negative electrode active material layer 2 contains a metal salt can be attained.

Moreover, the covering portion 302 may contain a conductive material. The details of the conductive material are, for example, similar to the details of the negative electrode conductive agent described above. In other words, the conductive material is, for example, carbon nanotube. This is because the conductivity of the covering portion 302 is improved.

Here, the negative electrode active material layer 2 may contain, for example, an additional normal temperature molten salt composition. In other words, the normal temperature molten salt composition, for example, is not only contained in the covering portion 302 but may also be dispersed in the negative electrode active material layer 2. This is because the amount of the normal temperature molten salt composition present in the vicinity of the second negative electrode active material 300 increases and thus the ion conductivity in the vicinity of the second negative electrode active material 300 is further improved.

However, the second negative electrode active material 300 may not include the covering portion 302 in a case in which the normal temperature molten salt composition contains a copolymer. This is because the copolymer performs a similar function to that of the covering portion 302 as described above.

Of course, in a case in which the second negative electrode active material 300 includes the center portion 301 and the covering portion 302, and the covering portion 302 may contain the normal temperature molten salt composition together with the covering material.

The occupation proportion in a case in which the covering portion 302 contains a normal temperature molten salt composition is a proportion of the weight of the covering portion 302 to the sum of the weight of the center portion 301 and the weight of the covering portion 302 in the same manner as in a case in which the above-described covering portion 302 does not contain a normal temperature molten salt composition. In other words, the occupation proportion is calculated by a calculation formula:

occupation proportion (% by weight)=[weight of covering portion 302/(weight of center portion 301+weight of covering portion 302)]*100. However, in the above calculation formula, the weight of the former (numerator) covering portion 302 is the weight of the covering material but the weight of the latter (denominator) covering portion 302 is the sum of the weight of the covering material, the weight of the normal temperature molten salt composition, and the weight of the conductive material.

This negative electrode is manufactured, for example, by a procedure similar to the procedure for fabricating the negative electrode in the first embodiment except that the procedure for forming the second negative electrode active material 300 is different. Hereinafter, a procedure for forming the second negative electrode active material 300 will be described.

In the case of forming the second negative electrode active material 300, the center portion 301 containing a silicon-based material, a normal temperature molten salt composition, and a covering material containing any one or two or more of a polyacrylate salt, polyacrylic acid, polyvinylidene fluoride, or polyvinylpyrrolidone are first mixed together. Subsequently, the mixture is put into a solvent and then the solvent is stirred. In this manner, the center portion 301 and the normal temperature molten salt composition are dispersed in the solvent, the covering material is dissolved in the solvent, and thus a dispersion containing the center portion 301, the normal temperature molten salt composition, and the covering material is prepared. Finally, the second negative electrode active material 300 is separated from the dispersion. In the dispersion, the covering portion 302 containing the normal temperature molten salt composition and the covering material is formed on the surface of the center portion 301, and thus the second negative electrode active material 300 containing the center portion 301 and the covering portion 302 is formed. The second negative electrode active material 300 that is a filtered product is obtained by filtering the dispersion. Of course, in order to obtain the second negative electrode active material 300, the dispersion may be sprayed using a spray drying apparatus and then dried as described above.

As described above, the covering portion 302 may not be formed in a case in which a copolymer is used as the normal temperature molten salt composition or the covering portion 302 may be formed so as to contain a copolymer together with the covering material.

In addition, in the case of using the above-mentioned additional normal temperature molten salt composition, the negative electrode active material containing the first negative electrode active material 200 and the second negative electrode active material 300 (center portion 301 and covering portion 302), the additional normal temperature molten salt composition, and, if necessary, a negative electrode binder, a negative electrode conductive agent and the like may be mixed together when the negative electrode mixture is prepared.

According to the negative electrode of the present embodiment, the negative electrode active material layer 2 contains the first negative electrode active material 200 (carbon-based material) and the second negative electrode active material 300 (center portion 301 containing a silicon-based material and covering portion 302) and the covering portion 302 contains a normal temperature molten salt composition. In this case, in the mixed system of a carbon-based material and a silicon-based material, the normal temperature molten salt composition is more likely to be present in the vicinity of the silicon-based material than in the vicinity of the carbon-based material and thus lithium is likely to be stored and released in the silicon-based material in the same manner as in the first embodiment. Consequently, the charge and discharge reaction is likely to smoothly and stably proceed in the negative electrode, the negative electrode in the charged state is thermally stable even when being exposed to a high temperature environment, and thus excellent battery characteristics can be attained.

In particular, the normal temperature molten salt composition is fixed onto the surface of the silicon-based material as the covering portion 302 provided on the surface of the center portion 301 contains a normal temperature molten salt composition, and thus the normal temperature molten salt composition is firmly fixed to the silicon-based material. Consequently, a state in which the normal temperature molten salt composition is present in the vicinity of the silicon-based material in a more amount than in the vicinity of the carbon-based material is likely to be maintained even when charge and discharge is repeated and thus a higher effect than in the first embodiment can be attained.

Moreover, if the normal temperature molten salt composition is bonded to the silicon-based material, the normal temperature molten salt composition is more firmly fixed to the silicon-based material, and thus a higher effect can be attained.

In addition, if the normal temperature molten salt composition is bonded to the negative electrode binder, a state in which the normal temperature molten salt composition is fixed onto the surface of the silicon-based material is likely to be maintained, and thus a higher effect can be attained.

Moreover, if the covering portion 302 contains a metal salt, the ion conductivity of the negative electrode active material layer 2 and the like is improved, and thus a higher effect can be attained.

The actions and effects other than these of the negative electrode of the present embodiment are similar to the actions and effects of the negative electrode of the first embodiment.

The configuration of the negative electrode of the present technology can be appropriately changed.

Figure 4:
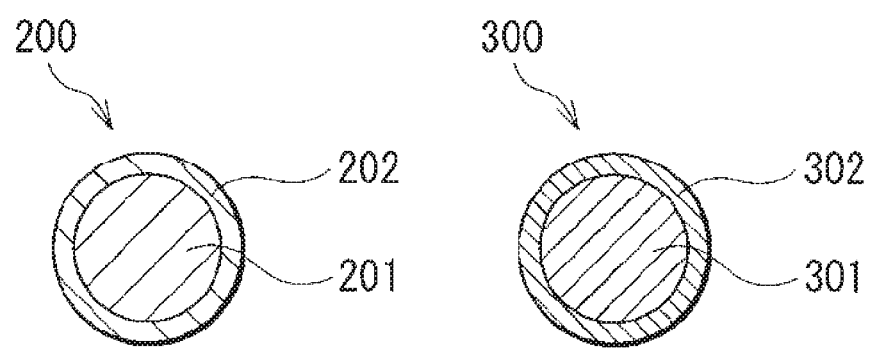
FIG. 4 is a sectional view illustrating a modified example related to the configuration of each of a first negative electrode active material and a second negative electrode active material according to an embodiment of the present technology.

Specifically, the first negative electrode active material 200 may have a configuration similar to that of the second negative electrode active material 300 (center portion 301 and covering portion 302) of the second aspect, for example, as illustrated in FIG. 4 corresponding to FIG. 3.

In other words, the first negative electrode active material 200 includes, for example, a center portion 201 corresponding to the center portion 301 and a covering portion 202 corresponding to the covering portion 302. The configuration of the center portion 201 is similar to the configuration of the center portion 301 except that, for example, a carbon-based material is contained instead of the silicon-based material. The configuration of the covering portion 202 is similar to the configuration of the covering portion 302 except that, for example, a normal temperature molten salt composition is not contained. In other words, the covering portion 202 contains a covering material.

This first negative electrode active material 200 is fabricated by a procedure similar to the procedure for fabricating the second negative electrode active material 300 except that, for example, a carbon-based material is used instead of a silicon-based material as a material for forming the center portion 201 and a normal temperature molten salt composition is not used as a material for forming the covering portion 202.

In this case as well, a similar effect can be attained as the second negative electrode active material 300 has the configuration described in the first embodiment or the second embodiment. In this case, particularly the first negative electrode active materials 200 are likely to be bound to each other with the covering portion 202 interposed therebetween and thus the binding property of the first negative electrode active materials 200 can be improved.

Next, a secondary battery including the negative electrode of the present technology described above will be described. In the following description, the constituent elements of the negative electrode of the present technology already described are referred to as needed.

Figure 5:
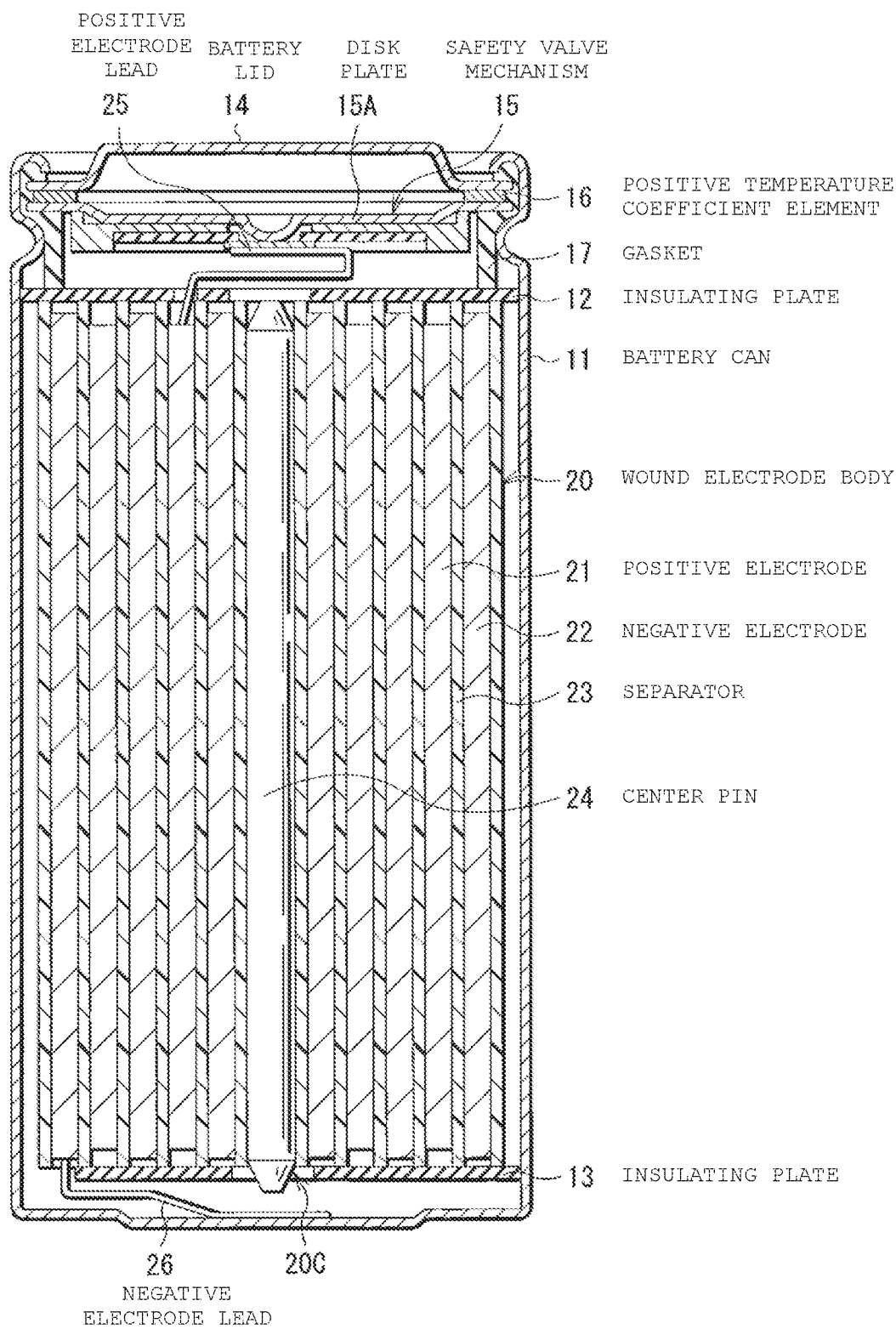
FIG. 5 is a sectional view illustrating the configuration of a secondary battery (cylindrical type) according to an embodiment of the present technology.
Figure 6:
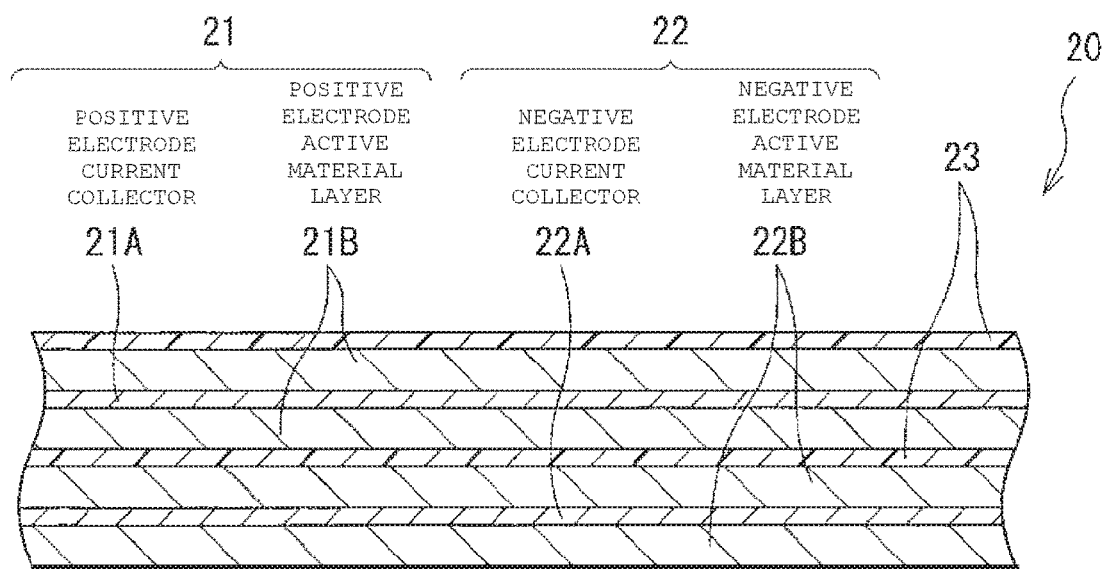
FIG. 6 is a sectional view illustrating a partial configuration of the wound electrode body illustrated in FIG. 5.

FIG. 5 illustrates a sectional configuration of a secondary battery, and FIG. 6 illustrates an enlarged diagram of a part of the sectional configuration of a wound electrode body 20 illustrated in FIG. 5.

The secondary battery described here is, for example, a lithium ion secondary battery in which the battery capacity (capacity of a negative electrode 22) is attained by utilizing the storage and release phenomena of lithium.

This secondary battery is a secondary battery of a cylindrical type in which the wound electrode body 20 which is a battery element is housed inside a battery can 11 having a hollow cylindrical shape as illustrated in FIG. 5.

Specifically, the secondary battery includes, for example, a pair of insulating plates 12 and 13 and the wound electrode body 20 inside the battery can 11. The wound electrode body 20 is formed by, for example, stacking a positive electrode 21 and a negative electrode 22 with a separator 23 interposed therebetween and then winding the positive electrode 21, the negative electrode 22, and the separator 23. This wound electrode body 20 is impregnated with an electrolytic solution which is a liquid electrolyte.

The battery can 11 has, for example, a hollow structure in which one end portion is closed and the other end portion is opened and includes, for example, any one or two or more of iron, aluminum, of alloys thereof. For example, nickel and the like may be plated on the surface of the battery can 11. Each of the pair of insulating plates 12 and 13 is disposed so as to sandwich the wound electrode body 20 therebetween and to extend perpendicularly to the wound peripheral surface.

The battery can 11 is sealed since a battery lid 14, a safety valve mechanism 15, and a positive temperature coefficient element (PTC element) 16 are crimped at the open end portion of the battery can 11 with a gasket 17 interposed therebetween. The battery lid 14 contains, for example, a material similar to the material for forming the battery can 11. Each of the safety valve mechanism 15 and the positive temperature coefficient element 16 is provided inside the battery lid 14, and the safety valve mechanism 15 is electrically connected to the battery lid 14 via the positive temperature coefficient element 16. In this safety valve mechanism 15, a disk plate 15A is reversed when the internal pressure of the battery can 11 is raised to a certain value or more by an internal short circuit, external heating, and the like. The electrical connection between the battery lid 14 and the wound electrode body 20 is thus disconnected. In order to prevent abnormal heat generation due to a large current, the resistance of the positive temperature coefficient element 16 increases as the temperature increases. The gasket 17 is formed of, for example, an insulating material, and the surface of the gasket 17 may be coated with, for example, asphalt and the like.

For example, a center pin 24 is inserted in a winding center 20C of the wound electrode body 20. However, the center pin 24 may not be inserted in the winding center 20C. A positive electrode lead 25 is attached to the positive electrode 21 and a negative electrode lead 26 is attached to the negative electrode 22. The positive electrode lead 25 contains, for example, a conductive material such as aluminum. This positive electrode lead 25 is, for example, attached to the safety valve mechanism 15 and is thus electrically connected to the battery lid 14. The negative electrode lead 26 contains, for example, a conductive material such as nickel. This negative electrode lead 26 is, for example, attached to the battery can 11 and is thus electrically connected to the battery can 11.

The positive electrode 21 includes a positive electrode current collector 21A and two positive electrode active material layers 21B provided on both surfaces of the positive electrode current collector 21A, for example, as illustrated in FIG. 6. However, only one positive electrode active material layer 21B may be provided on one surface of the positive electrode current collector 21A.

The positive electrode current collector 21A contains, for example, any one or two or more of conductive materials. The kind of conductive material is not particularly limited, and examples thereof include metal materials such as aluminum, nickel, and stainless steel. This positive electrode current collector 21A may be a single layer or multiple layers.

The positive electrode active material layer 21B contains any one or two or more of positive electrode materials capable of storing and releasing lithium as a positive electrode active material. However, the positive electrode active material layer 21B may further contain any one or two or more of other materials such as a positive electrode binder and a positive electrode conductive agent.

The positive electrode material is, for example, a lithium-containing compound. This is because a high energy density is attained. The kind of lithium-containing compound is not particularly limited, but examples thereof include a lithium-containing composite oxide and a lithium-containing phosphate compound.

A lithium-containing composite oxide is an oxide containing lithium and one or two or more other elements as constituent elements and has any crystal structure among, for example, a layered rock-salt crystal structure and a spinel crystal structure. A lithium-containing phosphate compound is a phosphate compound containing lithium and one or two or more other elements as constituent elements and has, for example, an olivine crystal structure. The other elements are elements other than lithium.

The kind of other elements is not particularly limited as long as it is any one or two or more of arbitrary elements. Among others, the other elements are preferably elements belonging to groups 2 to 15 in the extended periodic table. More specifically, the other elements are more preferably nickel (Ni), cobalt (Co), manganese (Mn), iron (Fe), and the like. This is because a high voltage is attained.

Examples of the lithium-containing composite oxide having a layered rock-salt crystal structure include compounds represented by the following respective Formulas (1) to (3).

$$Li_aMn_{(1-b-c)}Ni_bM1_cO_{(2-d)}F_e \quad (1)$$

(M1 represents at least one of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), or tungsten (W). a to e satisfy $0.8 \leq a \leq 1.2$, $0 < b < 0.5$, $0 < c < 0.5$, $(b+c) < 1$, $-0.1 \leq d \leq 0.2$, and $0 \leq e \leq 0.1$. However, the composition of lithium varies depending on the charged and discharged state, and a represents a value in a fully discharged state.)

$$Li_aNi_{(1-b)}M2_bO_{(2-c)}F_d \quad (2)$$

(M2 represents at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), or tungsten (W). a to d satisfy $0.8 \leq a \leq 1.2$, $0 \leq b < 0.5$, $-0.1 \leq c \leq 0.2$, and $0 \leq d \leq 0.1$. However, the composition of lithium varies depending on the charged and discharged state, and a represents a value in a fully discharged state.)

$$Li_aCo_{(1-b)}M3_bO_{(2-c)}F_d \quad (3)$$

(M3 represents at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), or tungsten (W). a to d satisfy $0.8 \leq a \leq 1.2$, $0 \leq b < 0.5$, $-0.1 \leq c \leq 0.2$, and $0 \leq d \leq 0.1$. However, the composition of lithium varies depending on the charged and discharged state, and a represents a value in a fully discharged state.)

Specific examples of the lithium-containing composite oxide having a layered rock-salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

In a case in which the lithium-containing composite oxide having a layered rock-salt crystal structure contains nickel, cobalt, manganese, and aluminum as constituent elements, the atomic ratio of nickel is preferably 50 atomic % or more. This is because a high energy density is attained.

The lithium-containing composite oxide having a spinel crystal structure is, for example, a compound represented by the following Formula (4).

$$Li_aMn_{(2-b)}M4_bO_cF_d \qquad (4)$$

(M4 represents at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), or tungsten (W). a to d satisfy $0.9 \le a \le 1.1$, $0 \le b \le 0.6$, $3.7 \le c \le 4.1$, and $0 \le d \le 0.1$. However, the composition of lithium varies depending on the charged and discharged state, and a represents a value in a fully discharged state.)

Specific examples of the lithium-containing composite oxide having a spinel crystal structure include $LiMn_2O_4$.

Examples of the lithium-containing phosphate compound having an olivine crystal structure include a compound represented by the following Formula (5).

$$Li_3M5PO \qquad (5)$$

(M5 represents at least one kind of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), or zirconium (Zr). a satisfies $0.9 \le a \le 1.1$. However, the composition of lithium varies depending on the charged and discharged state, and a represents a value in a fully discharged state.)

Specific examples of the lithium-containing phosphate compound having an olivine crystal structure include $LiFePO_4$, $LiMnPO_4$, $LiFe_{0.5}Mn_{0.5}PO_4$, and $LiFe_{0.3}Mn_{0.7}PO_4$.

The lithium-containing composite oxide may be a compound represented by the following Formula (6), and the like.

$$(Li_2MnO_3)_x(LiMnO_2)_{1-x} \qquad (6)$$

(x satisfies $0 \le x \le 1$. However, the composition of lithium varies depending on the charged and discharged state, and x represents a value in a fully discharged state.)

In addition to these, the positive electrode material may be, for example, oxides, disulfides, chalcogenides, and conductive polymers. Examples of the oxides include titanium oxide, vanadium oxide, and manganese dioxide. Examples of the disulfides include titanium disulfide and molybdenum sulfide. Examples of the chalcogenides include niobium selenide. Examples of the conductive polymers include sulfur, polyaniline, and polythiophene.

The details of the positive electrode binder are, for example, similar to the details of the negative electrode binder. In addition, the details of the positive electrode conductive agent are, for example, similar to the details of the negative electrode conductive agent.

The negative electrode 22 has a configuration similar to that of the negative electrode of the present technology described above. Specifically, the negative electrode 22 includes a negative electrode current collector 22A and a negative electrode active material layer 22B, for example, as illustrated in FIG. 6. The configuration of the negative electrode current collector 22A is similar to the configuration of the negative electrode current collector 1, and the configuration of the negative electrode active material layer 22B is similar to the configuration of the negative electrode active material layer 2.

In order to prevent unintentional precipitation of lithium metal on surface of the negative electrode 22 during charge, it is preferable that the chargeable capacity of the negative electrode material in this negative electrode 22 be greater than the discharge capacity of the positive electrode 21. In other words, it is preferable that the electrochemical equivalent of the negative electrode material capable of storing and releasing lithium is greater than the electrochemical equivalent of the positive electrode 21.

Particularly in the secondary battery described here, the electrochemical equivalent of the negative electrode material capable of storing and releasing lithium is greater than the electrochemical equivalent of the positive electrode in order to prevent unintentional precipitation of lithium metal on the surface of the negative electrode 22 during charge as described above. In addition, when the open circuit voltage (namely, battery voltage) at full charge is 4.25 V or more, the amount of lithium released per unit mass increases as compared with a case in which the open circuit voltage is 4.20 V even when the same positive electrode active material is used, and the amount of the positive electrode active material and the amount of the negative electrode active material are adjusted in consideration of this. A high energy density is thus attained.

For example, as illustrated in FIG. 6, the separator 23 is disposed between the positive electrode 21 and the negative electrode 22 and allows lithium ions to pass therethrough while preventing a short circuit of current due to contact between the two electrodes.

This separator 23 includes, for example, any one or two or more of porous films of synthetic resins, ceramics and the like and may be a laminated film of two or more of porous films. Examples of the synthetic resins include polytetrafluoroethylene, polypropylene, and polyethylene.

In particular, the separator 23 may include, for example, the above-described porous film (substrate layer) and a polymer compound layer provided on one or both surfaces of the substrate layer. This is because the adhesive property of the separator 23 to each of the positive electrode 21 and the negative electrode 22 is improved and thus the distortion of the wound electrode body 20 is suppressed. Hence, the decomposition reaction of the electrolytic solution is suppressed and the leakage of the electrolytic solution impregnated in the substrate layer is suppressed, thus the resistance hardly increases even when charge and discharge is repeated and battery swelling is suppressed.

The polymer compound layer contains, for example, a polymer compound such as polyvinylidene fluoride. This is because a polymer compound has excellent physical strength and is electrochemically stable. However, the polymer compound may be polymer compounds other than polyvinylidene fluoride. In the case of forming this polymer compound layer, for example, a solution in which a polymer compound is dissolved in an organic solvent or the like is applied to the substrate layer and then the substrate layer is dried. The substrate layer may be immersed in a solution and then dried.

The polymer compound layer may contain, for example, any one or two or more of insulating particles such as inorganic particles. This is because the separator 23 is less likely to be oxidized and the safety of the secondary battery is thus improved. Examples of the kind of inorganic particles include aluminum oxide and aluminum nitride.

The wound electrode body 20 is impregnated with an electrolytic solution as described above. This electrolytic solution contains, for example, a solvent and an electrolyte salt. However, the electrolytic solution may further contain any one or two or more of other materials such as additives.

The solvent contains any one or two or more of non-aqueous solvents such as organic solvents. The electrolytic solution containing a non-aqueous solvent is a so-called non-aqueous electrolytic solution.

Examples of the non-aqueous solvent include a cyclic carbonate ester, a chain carbonate ester, a lactone, a chain carboxylate ester, and a nitrile (mononitrile) compound. This is because an excellent battery capacity, excellent cycle characteristics, excellent storage characteristics and the like are attained.

Examples of the cyclic carbonate ester include ethylene carbonate, propylene carbonate, and butylene carbonate. Examples of the chain carbonate ester include dimethyl carbonate, diethyl carbonate, ethyl methyl carbonate, and methyl propyl carbonate. Examples of the lactone include γ-butyrolactone and γ-valerolactone. Examples of the chain carboxylate ester include methyl acetate, ethyl acetate, methyl propionate, ethyl propionate, methyl butyrate, methyl isobutyrate, methyl trimethylacetate, and ethyl trimethylacetate. Examples of the nitrile compound include acetonitrile, methoxyacetonitrile, and 3-methoxypropionitrile.

In addition to these, the non-aqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. This is because similar advantages are attained.

Among these, any one or two or more of cyclic carbonate esters or chain carbonate esters are preferable and any one or two or more of ethylene carbonate, propylene carbonate, dimethyl carbonate, diethyl carbonate, or ethyl methyl carbonate are more preferable. This is because a high battery capacity, excellent cycle characteristics, excellent storage characteristics and the like are attained. In this case, combinations of solvents having a high viscosity (high permittivity) (for example, relative permittivity $\varepsilon \geq 30$) such as ethylene carbonate and propylene carbonate with solvents having a low viscosity (for example, viscosity$\leq 1$ mPa·s) such as dimethyl carbonate, ethyl methyl carbonate, and diethyl carbonate are still more preferable.

This is because the dissociation property of the electrolyte salt and the mobility of ions are improved.

In addition, examples of the non-aqueous solvent include an unsaturated cyclic carbonate ester, a halogenated carbonate ester, a sulfonate ester, an acid anhydride, a dicyano compound (dinitrile compound), a diisocyanate compound, a phosphate ester, and an unsaturated chain compound. This is because the chemical stability of the electrolytic solution is improved.

An unsaturated cyclic carbonate ester is a general term for cyclic carbonate esters having one or two or more unsaturated bonds (carbon-carbon double bonds). Examples of this unsaturated cyclic carbonate ester include vinylene carbonate, vinyl ethylene carbonate, and methylene ethylene carbonate. The content of the unsaturated cyclic carbonate ester in the non-aqueous solvent is not particularly limited but is, for example, 0.01% by weight to 10%° by weight.

A halogenated carbonate ester is a general term for cyclic or chain carbonate esters containing one or two or more halogen elements as constituent elements. In a case in which the halogenated carbonate ester contains two or more halogen elements as a constituent element, the kind of the two or more halogen elements may be only one kind or two or more kinds. Examples of the halogenated cyclic carbonate ester include 4-fluoro-1,3-dioxolan-2-one and 4,5-difluoro-1,3-dioxolan-2-one. Examples of the halogenated chain carbonate ester include fluoromethyl methyl carbonate, bis(fluoromethyl) carbonate, and difluoromethyl methyl carbonate. The content of halogenated carbonate ester in the non-aqueous solvent is not particularly limited and is, for example, 0.01% by weight to 50% by weight.

Examples of the sulfonate ester include a monosulfonate ester and a disulfonate ester. The content of the sulfonate ester in the non-aqueous solvent is not particularly limited and is, for example, 0.01% by weight to 10% by weight.

The monosulfonate ester may be a cyclic monosulfonate ester or a chain monosulfonate ester. Examples of the cyclic monosulfonate ester include sultones such as 1,3-propane sultone and 1,3-propene sultone. Examples of the chain monosulfonate ester include a compound in which a cyclic monosulfonate ester is cleaved in the middle. The disulfonate ester may be a cyclic disulfonate ester or a chain disulfonate ester.

Examples of the acid anhydride include carboxylic anhydrides, disulfonic anhydrides, and carboxylic sulfonic anhydrides. Examples of the carboxylic anhydrides include anhydrous succinic acid, anhydrous glutaric acid, and anhydrous maleic acid. Examples of the disulfonic anhydrides include anhydrous ethanedisulfonic acid and anhydrous propanedisulfonic acid. Examples of the carboxylic sulfonic anhydrides include anhydrous sulfobenzoic acid, anhydrous sulfopropionic acid, and anhydrous sulfobutyric acid. The content of acid anhydride in the non-aqueous solvent is not particularly limited and is, for example, 0.5% by weight to 5% by weight.

A dinitrile compound is, for example, a compound represented by NC—R1-CN (R1 represents either of an alkylene group or an arylene group).

Examples of this dinitrile compound include succinonitrile (NC—$C_2H_4$—CN), glutaronitrile (NC—$C_3H_6$—CN), adiponitrile (NC—$C_4H_8$—CN), and phthalonitrile (NC—$C_6H_4$—CN). The content of dinitrile compound in the non-aqueous solvent is not particularly limited and is, for example, 0.5% by weight to 5% by weight.

A diisocyanate compound is, for example, a compound represented by OCN$^-$R2-NCO (R2 represents either of an alkylene group or an arylene group). Examples of this diisocyanate compound include hexamethylene diisocyanate (OCN$^-$$C_6H_{12}$—NCO). The content of diisocyanate compound in the non-aqueous solvent is not particularly limited and is, for example, 0.5% by weight to 5% by weight.

Examples of the phosphate ester include trimethyl phosphate and triethyl phosphate. The content of the phosphate ester in the non-aqueous solvent is not particularly limited and is, for example, 0.5% by weight to 5% by weight.

An unsaturated chain compound is a general term for chain compounds having one or two or more carbon-carbon triple bonds. Examples of this chain compound having a carbon-carbon triple bond include propargyl methyl carbonate (CH≡C—$CH_2$—O—C(=O)—O—$CH_3$) and propargyl methanesulfonate (CH≡C—$CH_2$—O—S(=O)$_2$—$CH_3$). The content of chain compound having a carbon-carbon triple bond in the non-aqueous solvent is not particularly limited and is, for example, 0.5% by weight to 5% by weight.

The electrolyte salt contains, for example, any one or two or more of lithium salts. However, the electrolyte salt may contain, for example, salts other than lithium salts.

Examples of the salts other than lithium salts include salts of light metals other than lithium.

Examples of the lithium salts include lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium methanesulfonate (LiCH$_3$SO$_3$), lithium trifluoromethanesulfonate (LiCF$_3$SO$_3$), lithium bis(fluorosulfonyl)amide (LiN(SO$_2$F)$_2$), lithium bis(trifluoromethanesulfonyl)amide (LiN(CF$_3$SO$_2$)$_2$), lithium tetrachloroaluminate (LiAlCl$_4$), dilithium hexafluorosilicate (Li$_2$SiF$_6$), lithium chloride (LiCl), and lithium bromide (LiBr).

This is because an excellent battery capacity, excellent cycle characteristics, excellent storage characteristics and the like are attained.

The content of electrolyte salt is not particularly limited but, among others, is preferably 0.3 mol/kg to 3.0 mol/kg with respect to the solvent. This is because high ion conductivity is attained.

This secondary battery operates, for example, as follows. At the time of charge, lithium ions are released from the positive electrode 21 and the lithium ions are stored in the negative electrode 22 via the electrolytic solution. On the other hand, at the time of discharge, lithium ions are released from the negative electrode 22 and the lithium ions are stored in the positive electrode 21 via the electrolytic solution.

This secondary battery is manufactured, for example, by the following procedure.

In the case of fabricating the positive electrode 21, a positive electrode active material and, if necessary, a positive electrode binder, a positive electrode conductive agent and the like are first mixed together to obtain a positive electrode mixture. Subsequently, the positive electrode mixture is dispersed in an organic solvent or the like to obtain a positive electrode mixture slurry in the form of paste. Finally, the positive electrode mixture slurry is applied to both surfaces of the positive electrode current collector 21A and then dried to form the positive electrode active material layer 21B. Thereafter, the positive electrode active material layer 21B is compression-molded using a roll press or the like, if necessary. In this case, the positive electrode active material layer 21B may be heated, or compression molding may be repeated plural times.

In the case of fabricating the negative electrode 22, the negative electrode active material layer 22B is formed on both surfaces of the negative electrode current collector 22A by a procedure similar to the procedure for fabricating the negative electrode of the present technology described above.

In the case of assembling a secondary battery, the positive electrode lead 25 is attached to the positive electrode current collector 21A by a welding method or the like and the negative electrode lead 26 is attached to the negative electrode current collector 22A by a welding method or the like. Subsequently, the positive electrode 21 and the negative electrode 22 are stacked with the separator 23 interposed therebetween, and then the positive electrode 21, the negative electrode 22, and the separator 23 are wound to form the wound electrode body 20. Subsequently, the center pin 24 is inserted into the winding center 20C of the wound electrode body 20.

Subsequently, the wound electrode body 20 is housed inside the battery can 11 while being sandwiched between the pair of insulating plates 12 and 13. In this case, the tip portion of the positive electrode lead 25 is attached to the safety valve mechanism 15 by a welding method or the like and the tip portion of the negative electrode lead 26 is attached to the battery can 11 by a welding method or the like. Subsequently, an electrolytic solution is injected into the battery can 11 to impregnate the wound electrode body 20 with the electrolytic solution. Finally, the battery lid 14, the safety valve mechanism 15, and the positive temperature coefficient element 16 are crimped at the opening end portion of the battery can 11 with the gasket 17 interposed therebetween.

In this manner, the wound electrode body 20 is enclosed inside the battery can 11, and a secondary battery of a cylindrical type is thus completed.

According to this secondary battery of a cylindrical type, the negative electrode 22 has a configuration similar to that of the negative electrode of the present technology described above, thus the charge and discharge reaction is likely to smoothly and stably proceed in the negative electrode 22 and the negative electrode 22 in the charged state is thermally stable even when being exposed to a high temperature environment as described above. Hence, excellent battery characteristics can be attained.

The actions and effects other than these of the secondary battery of a cylindrical type are similar to the actions and effects of the negative electrode of the present technology.

Figure 7:
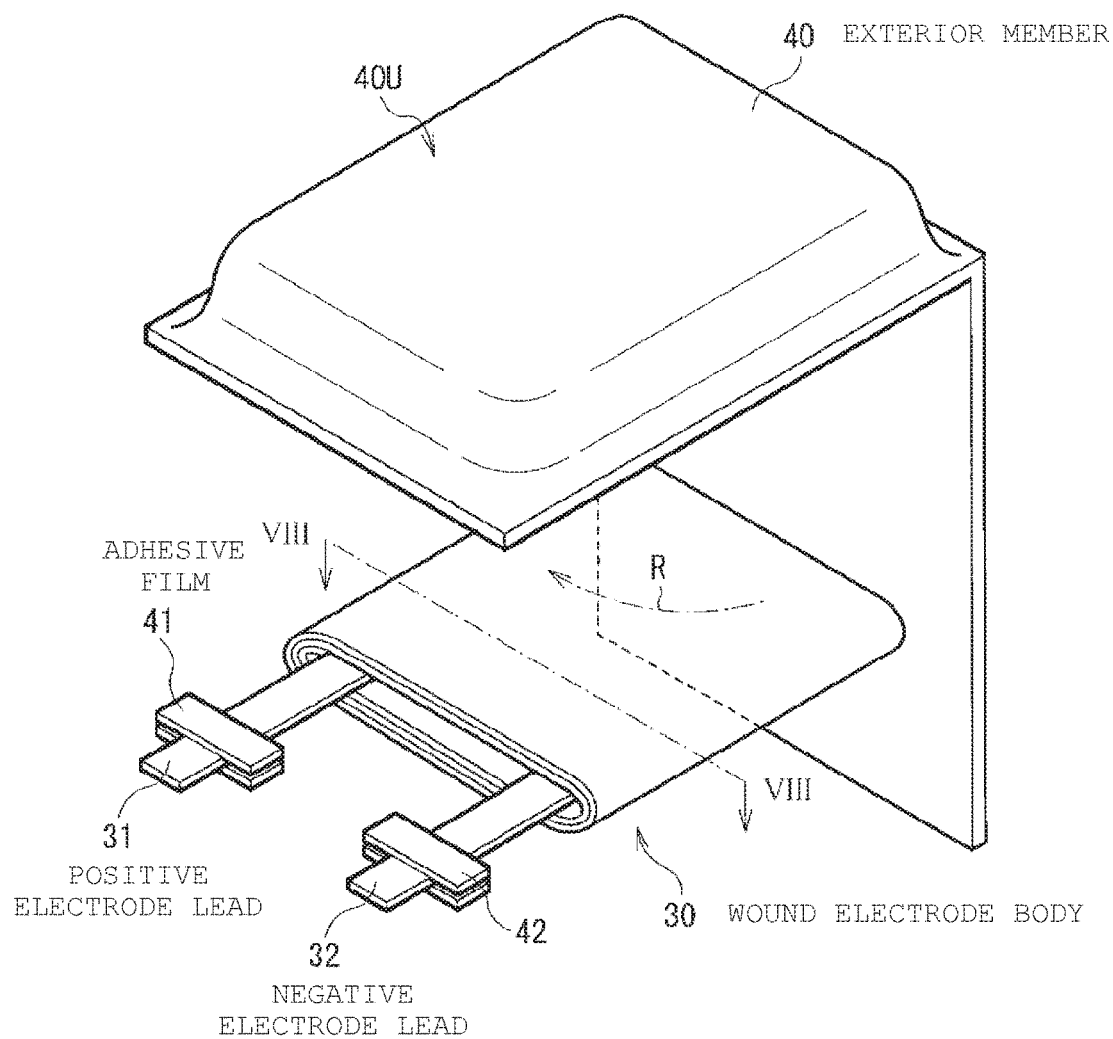
FIG. 7 is a perspective view illustrating the configuration of another secondary battery (laminated film type) according to an embodiment of the present technology.
Figure 8:
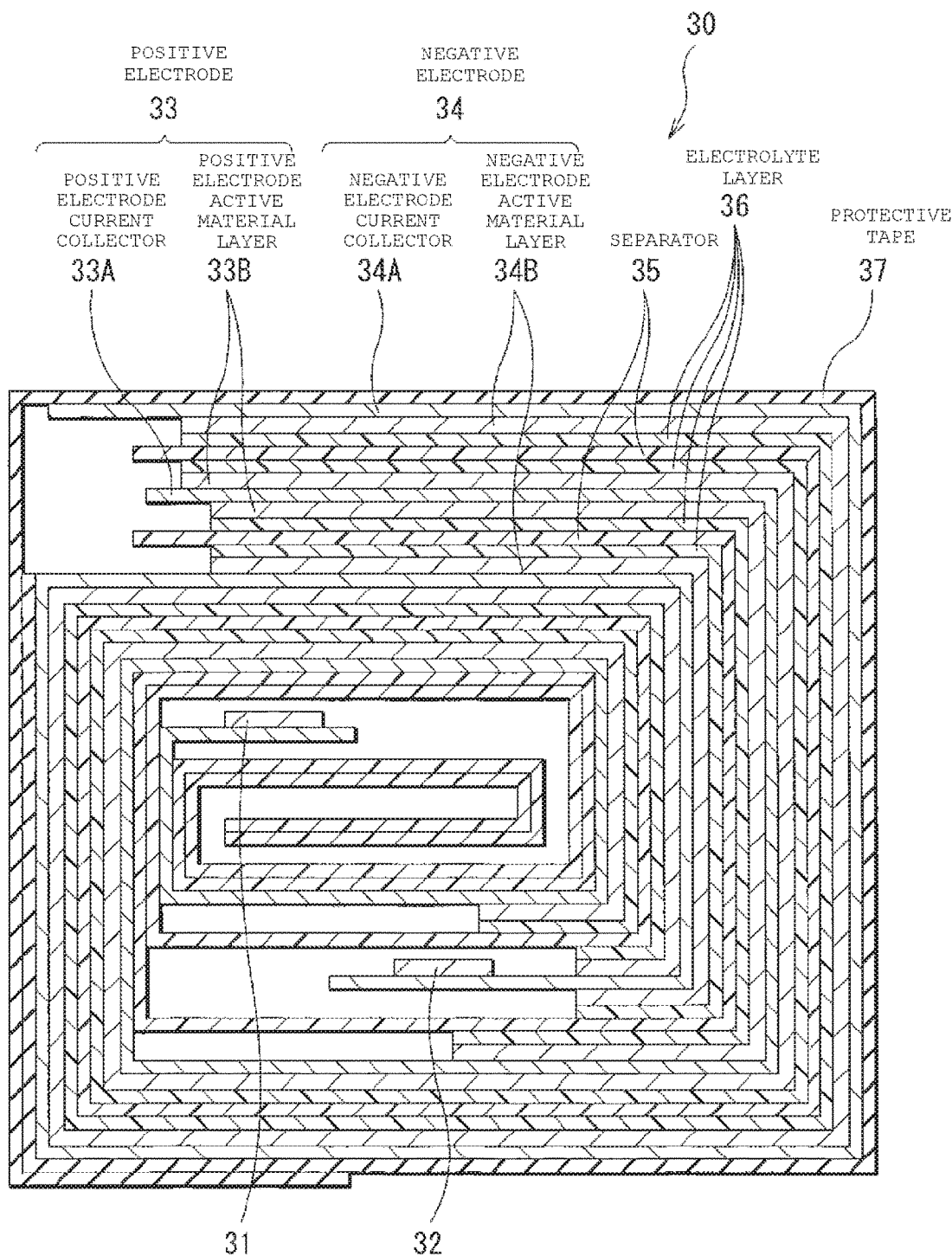
FIG. 8 is a sectional view of the wound electrode body illustrated in FIG. 7 taken along a line VIII-VIII.

FIG. 7 illustrates a perspective configuration of another secondary battery, and FIG. 8 illustrates a sectional configuration of a wound electrode body 30 taken along the line VIII-VIII illustrated in FIG. 7. A state in which the wound electrode body 30 and an exterior member 40 are distant from each other is illustrated in FIG. 7.

In the following description, the constituent elements of the secondary battery of a cylindrical type already described are referred to as needed.

This secondary battery is a secondary battery (lithium ion secondary battery) of a laminated film type in which the wound electrode body 30 which is a battery element is housed inside the exterior member 40 which has a film shape and exhibits flexibility (or plasticity), for example, as illustrated in FIG. 7.

Specifically, the secondary battery includes, for example, the wound electrode body 30 inside the exterior member 40. The wound electrode body 30 is formed, for example, by stacking a positive electrode 33 and a negative electrode 34 with a separator 35 and an electrolyte layer 36 interposed therebetween and then winding the positive electrode 33, the negative electrode 34, the separator 35, and the electrolyte layer 36. For example, this electrolyte layer 36 is disposed between the positive electrode 33 and the separator 35 and between the negative electrode 34 and the separator 35. A positive electrode lead 31 is attached to the positive electrode 33 and a negative electrode lead 32 is attached to the negative electrode 34. The outermost peripheral portion of the wound electrode body 30 is protected by a protective tape 37.

Each of the positive electrode lead 31 and the negative electrode lead 32 is led out in the same direction, for example, from the inside to the outside of the exterior member 40. The positive electrode lead 31 contains, for example, any one or two or more of conductive materials such as aluminum (Al). The negative electrode lead 32 contains, for example, any one or two or more of conductive materials such as copper (Cu), nickel (Ni), and stainless steel. These conductive materials have, for example, a thin plate shape or a mesh shape.

The exterior member 40 is, for example, one sheet of film capable of being folded in the direction of the arrow R illustrated in FIG. 7 and is provided with a hollow 40U for housing the wound electrode body 30. This exterior member 40 is, for example, a laminated film in which a fusion layer, a metal layer, and a surface protective layer are laminated in this order. In the manufacturing process of the secondary battery, for example, the exterior member 40 is folded so that the fusion layers face each other with the wound electrode body 30 interposed therebetween and then the peripheral edge portions of the fusion layers are fused to each other. However, two sheets of laminated films may be pasted to each other with an adhesive agent and the like interposed therebetween. The fusion layer is, for example, any one or two or more of films formed of polyethylene, polypropylene and the like.

The metal layer is, for example, any one or two or more of an aluminum foil and the like. The surface protective layer is, for example, any one or two or more of films formed of nylon, polyethylene terephthalate and the like.

Among these, the exterior member 40 is preferably an aluminum laminated film in which a polyethylene film, an aluminum foil, and a nylon film are laminated in this order. However, the exterior member 40 may be a laminated film having another laminated structure, a polymer film formed of polypropylene or the like, or a metal film.

For example, an adhesive film 41 is inserted between the exterior member 40 and the positive electrode lead 31 in order to prevent intrusion of outside air. In addition, for example, the adhesive film 41 described above is inserted between the exterior member 40 and the negative electrode lead 32. This adhesive film 41 contains a material exhibiting adhesive property to both the positive electrode lead 31 and the negative electrode lead 32. This material exhibiting adhesive property is, for example, a polyolefin resin and more specifically, any one or two or more of polyethylene, polypropylene, modified polyethylene, and modified polypropylene.

The positive electrode 33 includes a positive electrode current collector 33A and a positive electrode active material layer 33B, for example, as illustrated in FIG. 8. The negative electrode 34 includes a negative electrode current collector 34A and a negative electrode active material layer 34B, for example, as illustrated in FIG. 8. The configurations of the positive electrode current collector 33A, positive electrode active material layer 33B, negative electrode current collector 34A, and negative electrode active material layer 34B are, for example, similar to the configurations of the positive electrode current collector 21A, the positive electrode active material layer 21B, negative electrode current collector 22A, and negative electrode active material layer 22B. In addition, the configuration of the separator 35 is, for example, similar to the configuration of the separator 23.

The electrolyte layer 36 contains an electrolytic solution and a polymer compound. The electrolyte layer 36 described here is a so-called gel-like electrolyte, and the electrolytic solution is retained by the polymer compound in the electrolyte layer 36. This is because high ion conductivity (for example, 1 mS/cm or more at room temperature) is attained and leakage of the electrolytic solution is prevented. The electrolyte layer 36 may further contain any one or two or more of other materials such as additives.

The polymer compound includes, for example, any one or two or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, or polycarbonate. In addition to these, the polymer compound may be a copolymer. This copolymer is, for example, a copolymer of vinylidene fluoride and hexafluoropyrene. Among these, the homopolymer is preferably polyvinylidene fluoride and the copolymer is preferably a copolymer of vinylidene fluoride and hexafluoropyrene. This is because these are electrochemically stable.

In the electrolyte layer 36 which is a gel-like electrolyte, the "solvent" contained in the electrolytic solution is a broad concept including not only a liquid material but also a material exhibiting ion conductivity capable of dissociating an electrolyte salt. Hence, in the case of using a polymer compound exhibiting ion conductivity, the polymer compound is also included in the solvent.

An electrolytic solution may be used as it is instead of the electrolyte layer 36. In this case, the wound electrode body 30 (positive electrode 33, negative electrode 34, and separator 35) is impregnated with the electrolytic solution.

This secondary battery operates, for example, as follows.

At the time of charge, lithium ions are released from the positive electrode 33 and the lithium ions are stored in the negative electrode 34 via the electrolyte layer 36. On the other hand, at the time of discharge, lithium ions are released from the negative electrode 34 and the lithium ions are stored in the positive electrode 33 via the electrolyte layer 36.

The secondary battery including the gel-like electrolyte layer 36 is manufactured, for example, by the following three procedures.

In the case of fabricating the positive electrode 33, a positive electrode active material and, if necessary, a positive electrode binder, a positive electrode conductive agent and the like are first mixed together to obtain a positive electrode mixture. Subsequently, the positive electrode mixture is dispersed in an organic solvent or the like to prepare a positive electrode mixture slurry in the form of paste. Finally, the positive electrode mixture slurry is applied to both surfaces of the positive electrode current collector 33A and then dried to form the positive electrode active material layer 33B. Thereafter, the positive electrode active material layer 33B is compression-molded using a roll press or the like, if necessary. In this case, the positive electrode active material layer 33B may be heated, or compression molding may be repeated plural times.

In the case of fabricating the negative electrode 34, the negative electrode active material layer 34B is formed on both surfaces of the negative electrode current collector 34A by a procedure similar to the procedure for fabricating the negative electrode of the present technology described above.

In the case of forming the electrolyte layer 36, an electrolytic solution, a polymer compound, an organic solvent, and the like are mixed together and then the mixture is stirred to prepare a precursor solution in the form of sol. This precursor solution is applied to the positive electrode 33 and then dried to form the electrolyte layer 36, and the precursor solution is applied to the negative electrode 34 and then dried to form the electrolyte layer 36.

In the case of assembling a secondary battery, the positive electrode lead 31 is connected to the positive electrode current collector 33A by a welding method or the like and the negative electrode lead 32 is connected to the negative electrode current collector 34A by a welding method or the like. Subsequently, the positive electrode 33 on which the electrolyte layer 16 has been formed and the negative electrode 34 on which the electrolyte layer 16 has been formed are wound with the separator 35 interposed therebetween and then the positive electrode 33, the negative electrode 34, the separator 35, and the electrolyte layer 36 are wound to form the wound electrode body 30. Thereafter, the protective tape 37 is pasted to the outermost peripheral portion of the wound electrode body 30. Subsequently, in a state in which the wound electrode body 30 is housed in the hollow 40U, the exterior member 40 is folded so as to sandwich the wound electrode body 30 therebetween. Finally, the peripheral edge portions of the exterior member 40 are fused to each other by a heat seal method or the like to house the wound electrode body 30 inside the exterior member 40. In this case, the adhesive film 41 is inserted between the positive electrode lead 31 and the exterior member 40 and the adhesive film 42 is inserted between the negative electrode lead 32 and the exterior member 40.

In this manner, the wound electrode body 30 is enclosed inside the exterior member 40, and a secondary battery is thus completed.

First, each of the positive electrode 33 and the negative electrode 34 is fabricated by a procedure similar to the first procedure described above, and then the positive electrode lead 31 is connected to the positive electrode 33 by a welding method or the like and the negative electrode lead 32 is connected to the negative electrode 34 by a welding method or the like. Subsequently, the positive electrode 33 and the negative electrode 34 are stacked with the separator 35 interposed therebetween, and then the positive electrode 33, the negative electrode 34, and the separator 35 are wound to fabricate a wound body which is a precursor of the wound electrode body 30. Thereafter, the protective tape 37 is pasted to the outermost peripheral portion of the wound body.

Subsequently, the exterior member 40 is folded so as to sandwich the wound body therebetween and then the remaining peripheral edge portions of the exterior member 40 excluding the peripheral edge portion on one side are fused to each other by a heat seal method or the like to house the wound body inside the bag-shaped exterior member 40.

Subsequently, an electrolyte composition is prepared by mixing an electrolytic solution, a monomer which is a raw material of a polymer compound, a polymerization initiator, and, if necessary, other materials such as a polymerization inhibitor together and then stirring the mixture. Subsequently, the electrolyte composition is injected into the bag-shaped exterior member 40, and then the exterior member 40 is sealed by a heat seal method or the like.

Finally, a polymer compound is formed by thermally polymerizing the monomer in the electrolyte composition. In this manner, the electrolytic solution is retained by the polymer compound, and the electrolyte layer 36 is thus formed. Hence, the wound electrode body 30 is enclosed inside the exterior member 40.

First, a wound body is fabricated by a procedure similar to the second procedure described above except that the separator 35 is used in which two polymer compound layers are formed on both surfaces of a porous film (substrate layer). Subsequently, the wound body is housed inside the bag-shaped exterior member 40. Subsequently, the electrolytic solution is injected into the exterior member 40, and then the opening portion of the exterior member 40 is sealed by a heat seal method or the like. Finally, the separator 35 is brought into close contact with the positive electrode 33 with the polymer compound layer interposed therebetween and the separator 35 is brought into close contact with the negative electrode 34 with the polymer compound layer interposed therebetween by heating the exterior member 30 while applying a load to the exterior member 40. In this manner, the polymer compound layers are impregnated with the electrolytic solution and gelate, and the electrolytic solution is retained by the polymer compound, and the electrolyte layer 36 is thus formed. Hence, the wound electrode body 30 is enclosed inside the exterior member 40.

In this third procedure, the secondary battery is less likely to swell as compared with that in the first procedure. Moreover, the solvent and the monomer (raw material of polymer compound) and the like are less likely to remain in the electrolyte layer 36 in the third procedure as compared with that in the second procedure, and thus the step of forming a polymer compound is favorably controlled. In this manner, each of the positive electrode 33, the negative electrode 34, and the separator 35 is sufficiently brought into close contact with the electrolyte layer 36.

According to this secondary battery of laminated film type, the negative electrode 34 has a configuration similar to that of the negative electrode of the present technology, and thus excellent battery characteristics can be attained in the same manner as in the case of the secondary battery of a cylindrical type. The actions and effects other than these of the secondary battery of a laminated film type are similar to the actions and effects of the negative electrode of the present technology.

Next, application examples of the above-described secondary batteries will be described.

The applications of the secondary batteries are not particularly limited as long as these are machines, devices, instruments, apparatuses, and systems (an assembly of a plurality of devices) which can utilize the secondary batteries as a power source for driving or an electric power storage source for storing electric power. The secondary battery to be used as a power source may be a main power source or an auxiliary power source. The main power source is a power source to be preferentially used regardless of the presence or absence of other power sources. The auxiliary power source may be, for example, a power source to be used instead of the main power source or a power source which can be switched from the main power source, if necessary. In the case of using the secondary batteries as an auxiliary power source, the kind of main power source is not limited to secondary batteries.

The applications of the secondary batteries are, for example, as follows. The applications of the secondary batteries include electronic devices (including portable electronic devices) such as video cameras, digital still cameras, mobile phones, notebook computers, cordless phones, headphone stereos, portable radios, portable televisions, and portable information terminals. The applications of the secondary batteries include portable daily appliances such as electric shavers. The applications of the secondary batteries include memory apparatuses such as backup power sources and memory cards. The applications of the secondary batteries include electric tools such as electric drills and electric saws. The applications of the secondary batteries include battery packs to be mounted on notebook computers and the like as a detachable power source. The applications of the secondary batteries include medical electronic devices such as pacemakers and hearing aids. The applications of the secondary batteries include electric vehicles such as electric automobiles (including hybrid automobiles). The applications of the secondary batteries include electric power storage systems such as household battery systems which store electric power in case of an emergency. Of course, the applications of the secondary batteries may be applications other than those mentioned above.

Among these, it is effective that the secondary batteries are applied to a battery pack, an electric vehicle, an electric power storage system, an electric tool, an electronic device, and the like. This is because excellent battery characteristics are required for these applications and thus the performance can be effectively improved by use of the secondary batteries of the present technology. A battery pack is a power source including a secondary battery. A single battery or an assembled battery may be used in this battery pack as to be described later. An electric vehicle is a vehicle which operates (travels) using a secondary battery as a power source for driving and may be a an automobile (a hybrid automobile or the like) provided with a driving source in addition to a secondary battery as described above. The electric power storage system is a system which uses a secondary battery as a power storage source. For example, in a household electric power storage system, electric power is accumulated in a secondary battery which is an electric power storage source and household electric appliances and the like can be thus used by utilizing the electric power. An electric tool is a tool in which a moving unit (for example, a drill) moves using a secondary battery as a power source for driving. An electronic device is a device which performs various functions using a secondary battery as a power source for driving (power supply source).

Here, several application examples of the secondary batteries will be specifically described. The configurations of the application examples to be described below are simply examples and thus the configurations of the application examples can be appropriately changed.

Figure 9:
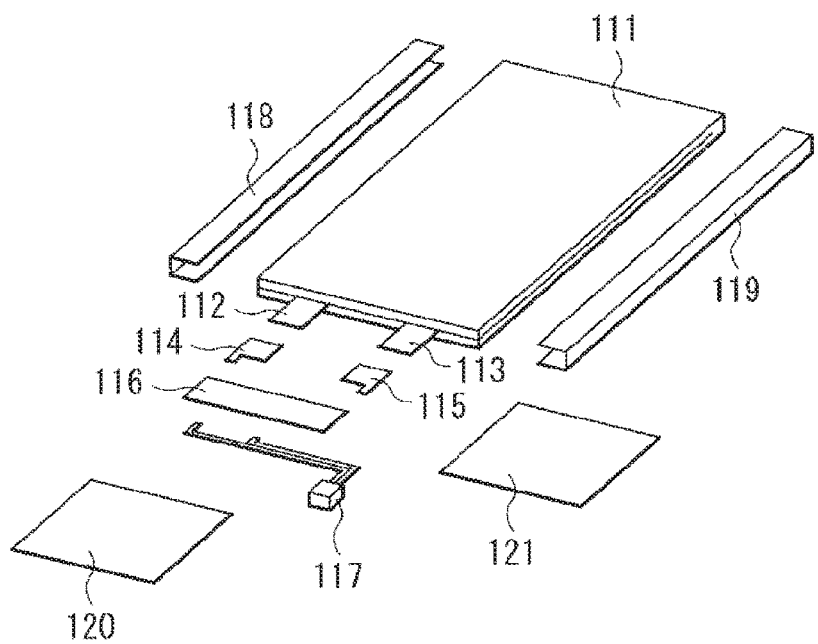
FIG. 9 is a perspective view illustrating the configuration of an application example (battery pack: single battery) of a secondary battery according to an embodiment of the present technology.
Figure 10:
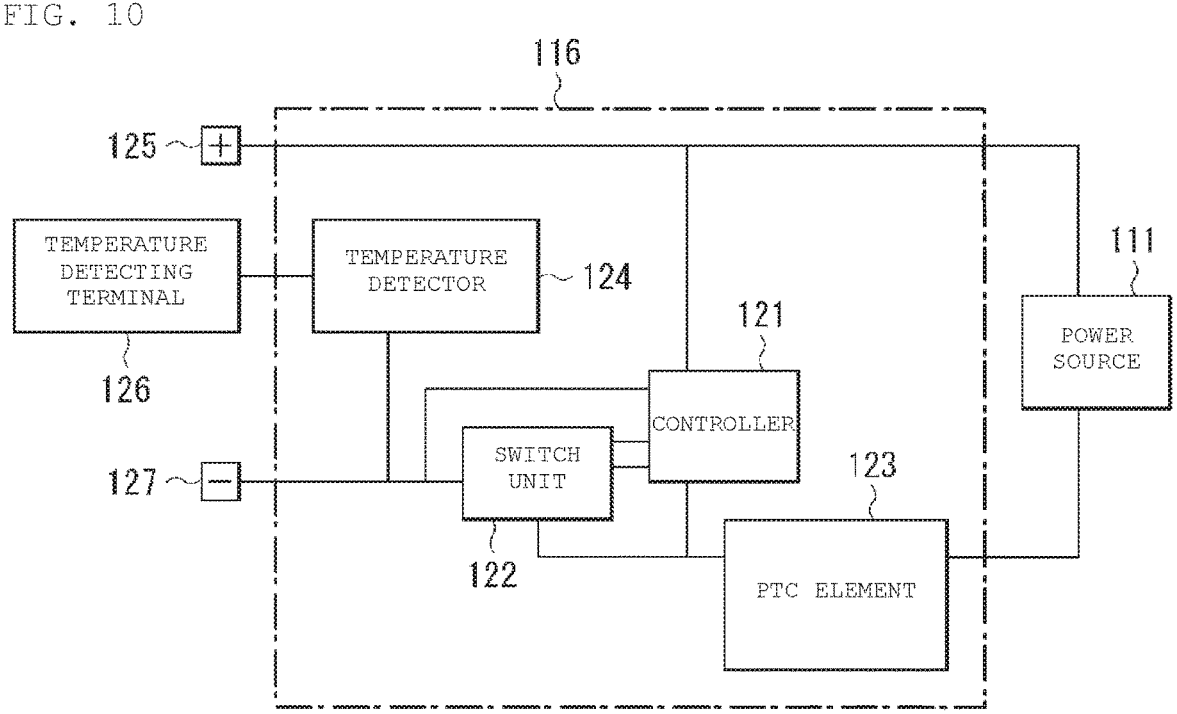
FIG. 10 is a block diagram illustrating the configuration of the battery pack illustrated in FIG. 9.

FIG. 9 illustrates a perspective configuration of a battery pack including a single battery. FIG. 10 illustrates a block configuration of the battery pack illustrated in FIG. 9. A state in which the battery pack is disassembled is illustrated in FIG. 9.

The battery pack described here is a simple battery pack (so-called soft pack) including one secondary battery and is mounted on, for example, an electronic device typified by a smartphone. This battery pack includes a power source 111 which is a secondary battery of a laminated film type, and a circuit board 116 to be connected to the power source 111, for example, as illustrated in FIG. 9. A positive electrode lead 112 and a negative electrode lead 113 are attached to this power source 111.

A pair of adhesive tapes 118 and 119 are pasted to both side surfaces of the power source 111. A protection circuit module (PCM) is formed on the circuit board 116. This circuit board 116 is connected to the positive electrode 112 via a tab 114 and connected to the negative electrode lead 113 via a tab 115. In addition, the circuit board 116 is connected to a lead wire 117 with a connector for external connection. In a state in which the circuit board 116 is connected to the power source 111, the circuit board 116 is protected by a label 120 and an insulating sheet 121. As this label 120 is pasted, the circuit board 116, the insulating sheet 121 and the like are fixed.

Moreover, the battery pack includes the power source 111 and the circuit board 116, for example, as illustrated in FIG. 10. The circuit board 116 includes, for example, a controller 121, a switch unit 122, a PTC element 123, and a temperature detector 124. The power source 111 can be connected to the outside via a positive terminal 125 and a negative terminal 127 and thus is charged and discharged through the positive terminal 125 and the negative terminal 127. The temperature detector 124 detects the temperature using a temperature detecting terminal (so-called T terminal) 126.

The controller 121 controls the operation (including the usage state of the power source 111) of the entire battery pack. This controller 121 includes, for example, a central processing unit (CPU) and a memory.

This controller 121 cuts off the switch unit 122 so that the charge current does not flow in the current path of the power source 111, for example, when the battery voltage reaches the overcharge detection voltage. In addition, the controller 121 blocks the charge current by cutting off the switch unit 122, for example, when a large current flows at the time of charge.

On the other hand, the controller 121 cuts off the switch unit 122 so that the discharge current does not flow in the current path of the power source 111, for example, when the battery voltage reaches the overdischarge detection voltage. In addition, the controller 121 blocks the discharge current by cutting off the switch unit 122, for example, when a large current flows at the time of discharge.

The overcharge detection voltage is not particularly limited and is, for example, 4.2 V±0.05 V and the overdischarge detection voltage is not particularly limited and is, for example, 2.4 V±0.1 V.

The switch unit 122 switches the usage state of the power source 111, namely, the connection state of the power source 111 to an external device in accordance with the instruction from the controller 121. This switch unit 122 includes, for example, a charge control switch and a discharge control switch. Each of the charge control switch and the discharge control switch is, for example, a semiconductor switch such as a metal oxide semiconductor field effect transistor (MOSFET). The charge and discharge current is detected based on, for example, the ON resistance of the switch unit 122.

The temperature detector 124 measures the temperature of the power source 111 and outputs the measurement result of temperature to the controller 121. This temperature detector 124 includes, for example, a temperature detecting element such as a thermistor. The measurement result of temperature to be measured by the temperature detector 124 is used in a case in which the controller 121 performs charge and discharge control at the time of abnormal heat generation, a case in which the controller 121 performs correction processing when calculating the remaining capacity, and the like.

The circuit board 116 may not include the PTC element 123. In this case, a PTC element may be separately installed in the circuit board 116.

Figure 11:
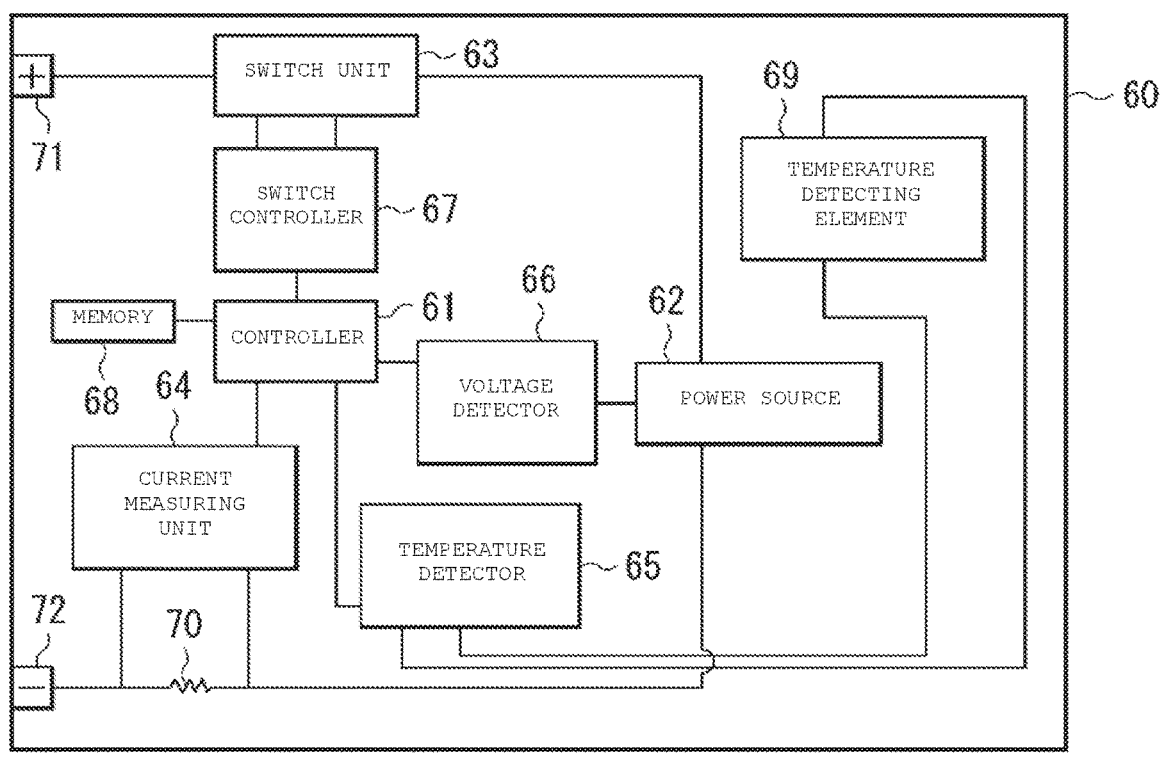
FIG. 11 is a block diagram illustrating the configuration of an application example (battery pack: assembled battery) of a secondary battery according to an embodiment of the present technology.

FIG. 11 illustrates a block configuration of a battery pack including an assembled battery.

This battery pack includes, for example, a controller 61, a power source 62, a switch unit 63, a current measuring unit 64, a temperature detector 65, a voltage detector 66, a switch controller 67, a memory 68, a temperature detecting element 69, a current detecting resistor 70, a positive terminal 71, and a negative terminal 72 inside a housing 60. This housing 60 contains, for example, a plastic material.

The controller 61 controls the operation (including the usage state of the power source 62) of the entire battery pack. This controller 61 includes, for example, a CPU. The power source 62 is an assembled battery including two or more secondary batteries, and the connection form of the two or more secondary batteries may be series connection, parallel connection, or a mixed form of these. As an example, the power source 62 includes six secondary batteries in which three sets of two batteries connected in parallel are connected in series.

The switch unit 63 switches the usage state of the power source 62, namely, the connection state of the power source 62 to an external device in accordance with the instruction from the controller 61. This switch unit 63 includes, for example, a charge control switch, a discharge control switch, a charge diode, and a discharge diode. Each of the charge control switch and the discharge control switch is, for example, a semiconductor switch such as a metal oxide semiconductor field effect transistor (MOSFET).

The current measuring unit 64 measures the current using the current detecting resistor 70 and outputs the measurement result of current to the controller 61. The temperature detector 65 measures the temperature using the temperature detecting element 69 and outputs the measurement result of temperature to the controller 61. This measurement result of temperature is, for example, used in a case in which the controller 61 performs charge and discharge control at the time of abnormal heat generation, a case in which the controller 61 performs correction processing when calculating the remaining capacity, and the like. The voltage detector 66 measures the voltage of the secondary battery in the power source 62 and supplies the analog-digital converted measurement result of voltage to the controller 61.

The switch controller 67 controls the operation of the switch unit 63 in accordance with the signals input from the current measuring unit 64 and the voltage detector 66, respectively.

This switch controller 67 cuts off the switch unit 63 (charge control switch) so that the charge current does not flow in the current path of the power source 62, for example, when the battery voltage reaches the overcharge detection voltage. Hence, in the power source 62, only discharge is possible through the discharge diode. The switch controller 67 blocks the charge current, for example, when a large current flows at the time of charge.

In addition, the switch controller 67 cuts off the switch unit 63 (discharge control switch) so that the discharge current does not flow in the current path of the power source 62, for example, when the battery voltage reaches the overdischarge detection voltage. Hence, in the power source 62, only charge is possible through the charge diode. The switch controller 67 blocks the discharge current, for example, when a large current flows at the time of discharge.

The overcharge detection voltage is not particularly limited and is, for example, 4.2 V±0.05 V and the overdischarge detection voltage is not particularly limited and is, for example, 2.4 V±0.1 V.

The memory 68 includes, for example, an EEPROM which is a nonvolatile memory. In this memory 68, for example, numerical values calculated by the controller 61, the information (for example, internal resistance in the initial state) on the secondary battery measured at the manufacturing process stage, and the like are memorized. The controller 61 can grasp information such as the remaining capacity when the full charge capacity of the secondary battery is memorized in the memory 68.

The temperature detecting element 69 measures the temperature of the power source 62 and outputs the measurement result of temperature to the controller 61. This temperature detecting element 69 includes, for example, a thermistor.

Each of the positive terminal 71 and the negative terminal 72 is a terminal to be connected to an external device (for example, a notebook personal computer) which works using a battery pack, an external device (for example, a charger) which is used to charge a battery pack, and the like. The power source 62 is charged and discharged through the positive terminal 71 and the negative terminal 72.

Figure 12:
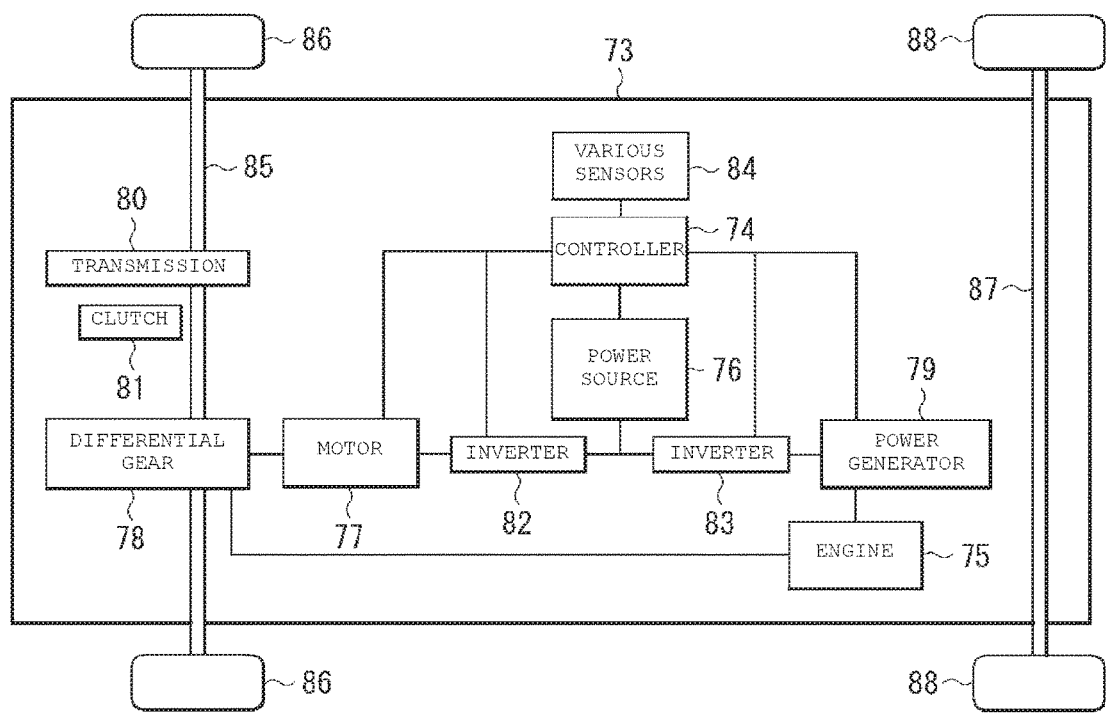
FIG. 12 is a block diagram illustrating the configuration of an application example (electric vehicle) of a secondary battery according to an embodiment of the present technology.

FIG. 12 illustrates a block configuration of a hybrid automobile which is an example of an electric vehicle.

This electric vehicle includes, for example, a controller 74, an engine 75, a power source 76, a driving motor 77, a differential gear 78, a power generator 79, a transmission 80 and a clutch 81, inverters 82 and 83, and various sensors 84 inside a metal housing 73. In addition to these, the electric vehicle includes, for example, a front wheel drive shaft 85 connected to the differential gear 78 and the transmission 80, front wheels 86, a rear wheel drive shaft 87, and rear wheels 88.

This electric vehicle can travel using, for example, either of the engine 75 or the motor 77 as a driving source. The engine 75 is a main power source, and examples thereof include a gasoline engine. In the case of using the engine 75 as a power source, for example, the driving force (torque) of the engine 75 is transmitted to the front wheels 86 and the rear wheels 88 via the differential gear 78, the transmission 80, and the clutch 81 which are driving units (drivers). The torque of the engine 75 is transmitted to the power generator 79, thus the power generator 79 generates alternating current power utilizing the torque and the alternating current power is converted into direct current power by the inverter 83, and the direct current power is thus accumulated in the power source 76. Meanwhile, in the case of using the motor 77 which is a converter as a power source, the electric power (direct current power) supplied from the power source 76 is converted into alternating current power by the inverter 82, and thus the motor 77 is driven utilizing the alternating current power. The driving force (torque) converted from electric power by this motor 77 is transmitted to the front wheels 86 and the rear wheels 88, for example, via the differential gear 78, the transmission 80, and the clutch 81 which are driving units (drivers).

When the electric vehicle is decelerated by the brake mechanism, the resistance force at the time of deceleration is transmitted to the motor 77 as a torque, and thus the motor 77 may generate alternating current power utilizing the torque. This alternating current power is converted into direct current power by the inverter 82, and thus the direct current regenerative electric power is preferably accumulated in the power source 76.

The controller 74 controls the operation of the entire electric vehicle. This controller 74 includes, for example, a CPU. The power source 76 includes one or two or more secondary batteries. This power source 76 may be connected to an external power source and receives electric power supply from the external power source to accumulate electric power in the power source 76. The various sensors 84 are used, for example, to control the number of revolutions of the engine 75 and to control the opening of the throttle valve (throttle opening). These various sensors 84 include any one or two or more of, for example, a speed sensor, an acceleration sensor, or an engine speed sensor.

A case in which the electric vehicle is a hybrid automobile is taken as an example, but the electric vehicle may be a vehicle (electric automobile) which operates using only the power source 76 and the motor 77 without using the engine 75.

Figure 13:
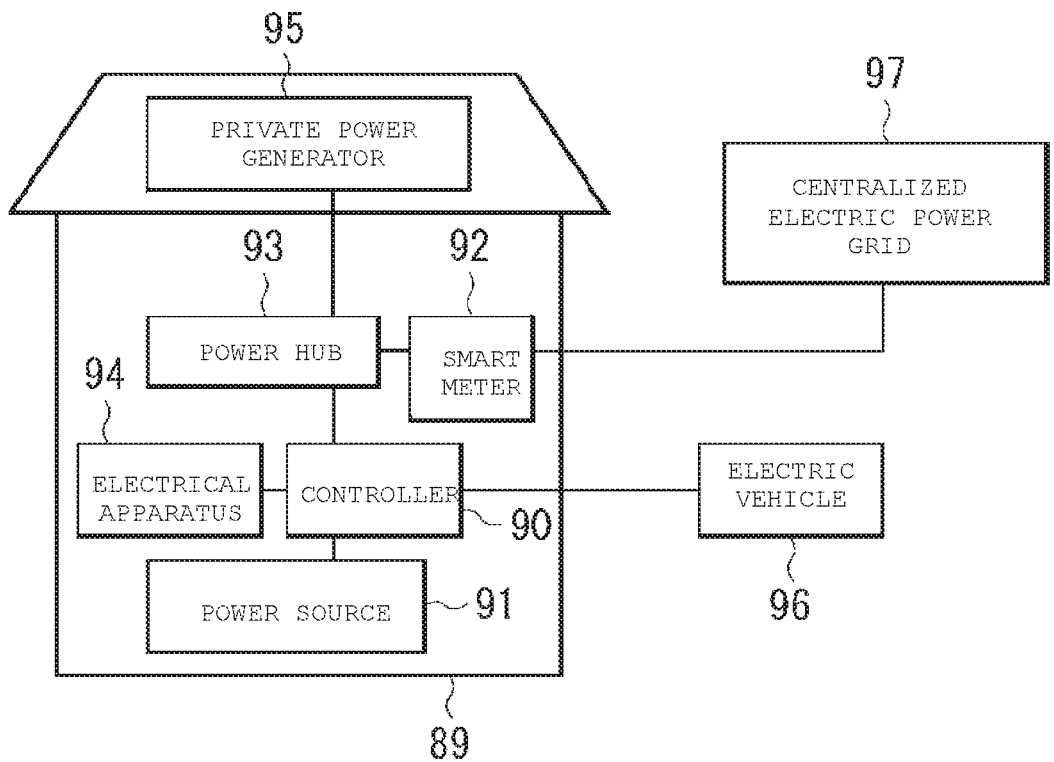
FIG. 13 is a block diagram illustrating the configuration of an application example (electric power storage system) of a secondary battery according to an embodiment of the present technology.

FIG. 13 illustrates a block configuration of an electric power storage system.

This electric power storage system includes, for example, a controller 90, a power source 91, a smart meter 92, and a power hub 93 inside a house 89 such as a general house and a commercial building.

Here, the power source 91 can be connected to, for example, an electrical apparatus 94 installed inside the house 89 and an electric vehicle 96 stopped outside the house 89. In addition, the power source 91 can be connected to, for example, a private power generator 95 installed in the house 89 via the power hub 93 and an external centralized electric power system 97 via the smart meter 92 and the power hub 93.

The electrical apparatus 94 includes, for example, one or two or more of household appliances, and examples of the household appliances include a refrigerator, an air conditioner, a television, and a water heater. The private power generator 95 includes any one or two or more of, for example, a solar power generator, or a wind power generator. The electric vehicle 96 includes any one or two or more of, for example, an electric automobile, an electric motorcycle, or a hybrid automobile. The centralized electric power system 97 includes any one or two or more of, for example, a thermal power plant, a nuclear power plant, a hydroelectric power plant, or a wind power plant.

The controller 90 controls the operation (including the usage state of the power source 91) of the entire electric power storage system. This controller 90 includes, for example, a CPU. The power source 91 includes one or two or more secondary batteries. The smart meter 92 is, for example, a network-compatible electric power meter installed in the house 89 on the electric power demand side and can communicate with the electric power supply side. Accordingly, the smart meter 92 enables highly efficient and stable energy supply, for example, by controlling the balance between the supply and demand of electric power in the house 89 while communicating with the outside.

In this electric power storage system, for example, electric power is accumulated in the power source 91 from the centralized electric power system 97 which is an external power source via the smart meter 92 and the power hub 93 and from the private power generator 95 which is an independent power source via the power hub 93. The electric power accumulated in this power source 91 is supplied to the electrical apparatus 94 and the electric vehicle 96 in accordance with the instruction from the controller 90, and thus the electrical apparatus 94 can work and the electric vehicle 96 can be charged. In other words, the electric power storage system is a system which makes it possible to accumulate and supply electric power in the house 89 using the power source 91.

The electric power accumulated in this power source 91 can be used if necessary.

For this reason, for example, electric power can be accumulated from the centralized electric power system 97 to the power source 91 at midnight when the electricity usage fee is low and the electric power accumulated in this power source 91 can be used during the day when the electricity usage fee is high.

The electric power storage system described above may be installed for each house (one household) or for a plurality of houses (multiple households).

Figure 14:
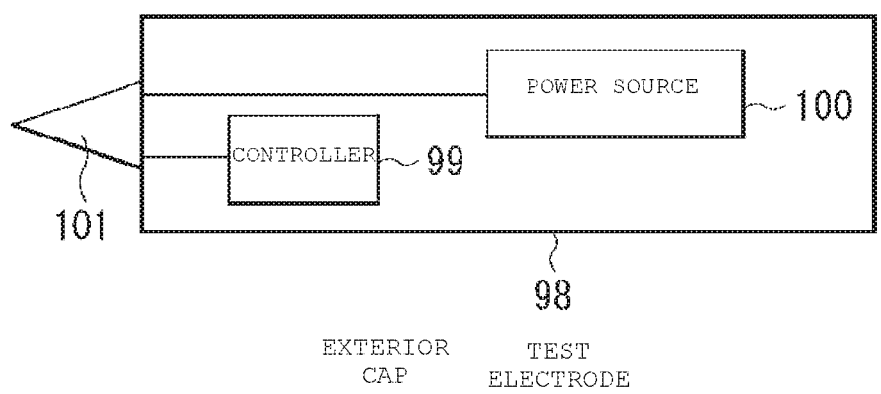
FIG. 14 is a block diagram illustrating the configuration of an application example (electric tool) of a secondary battery according to an embodiment of the present technology.

FIG. 14 illustrates a block configuration of an electric tool.

Examples of the electric tool described here include an electric drill. This electric tool includes, for example, a controller 99 and a power source 100 inside a tool body 98. For example, a drill unit 101 which is a moving unit is attached to this tool body 98 so as to work (rotate).

The tool body 98 contains, for example, a plastic material. The controller 99 controls the operation (including the usage state of the power source 100) of the entire electric tool. This controller 99 includes, for example, a CPU. The power source 100 includes one or two or more secondary batteries. The controller 99 supplies electric power from the power source 100 to the drill unit 101 in accordance with the operation of the operation switch.

EXAMPLES

Examples of the present technology will be described.

Experimental Examples 1-1 to 1-29

First, a secondary battery including the negative electrode of the first embodiment described above was fabricated, and the battery characteristics of the secondary battery were evaluated.

Figure 15:
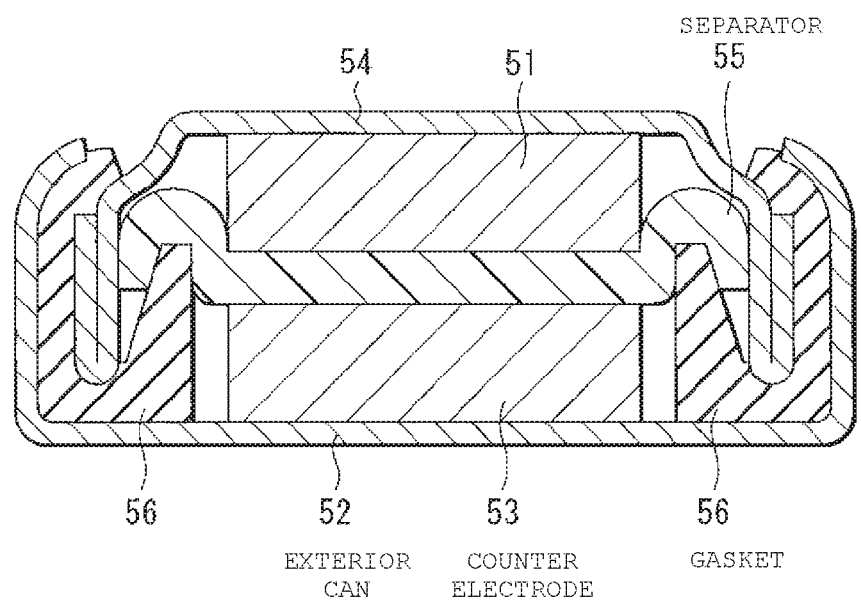
FIG. 15 is a sectional view illustrating the configuration of a secondary battery (coin type) for test according to an embodiment of the present technology.

A secondary battery (lithium ion secondary battery) of a coin type illustrated in FIG. 15 was fabricated as a secondary battery for test by the following procedure.

In this secondary battery, a counter electrode 53 housed inside an exterior can 52 and a test electrode 51 housed inside an exterior cap 54 are stacked with a separator 55 interposed therebetween and the exterior can 52 and the exterior cap 54 are crimped with a gasket 56 interposed therebetween. Each of the test electrode 51, the counter electrode 53, and the separator 55 is impregnated with an electrolytic solution.

In the case of fabricating the counter electrode 53, a positive electrode mixture was first prepared by mixing 98 parts by mass of a positive electrode active material (lithium cobaltate ($LiCoO_2$)), 1 part by mass of a positive electrode binder (polyvinylidene fluoride), and 1 part by mass of a positive electrode conductive agent (Ketjen Black) together. Subsequently, the positive electrode mixture was mixed with an organic solvent (N-methyl-2-pyrrolidone), and then the mixture was stirred (kneaded) using a rotary and revolutionary mixer to prepare a positive electrode mixture slurry in the form of paste. Subsequently, the positive electrode mixture slurry was applied to one surface of a positive electrode current collector (15 μm thick aluminum foil) using a coating apparatus and then dried (drying temperature=120° C.) to form a positive electrode active material layer. Finally, the positive electrode active material layer was compression-molded using a hand press, and then vacuum-dried. In this case, the volume density of the positive electrode active material layer was set to 3.6 g/cm$^3$.

In the case of fabricating the test electrode 51, a silicon-based material, an aqueous solution of a covering material (sodium polyacrylate (SPA) which was a polyacrylate salt), and a solvent (pure water) were first mixed together. As the silicon-based material (median diameter D50=3 μm), elemental silicon (Si), a silicon alloy ($SiTi_{0.3}$), and a silicon compound (SiO) were used. Subsequently, the mixture was stirred (stirring time=1 hour) using a stirrer to obtain a dispersion containing a silicon-based material and a covering material. Subsequently, the dispersion was sprayed using a spray drying apparatus (manufactured by Fujisaki Electric Co., Ltd.) and then dried (drying temperature=120° C.). In this manner, the surface of the center portion containing a silicon-based material was covered with the covering portion containing a covering material, and a second negative electrode active material was thus obtained. The occupation proportion (% by weight) of the covering material is as presented in Tables 1 and 2.

Subsequently, a first negative electrode active material (mesocarbon microbeads (MCMB) which was a carbon-based material, median diameter D50=21 μm), the second negative electrode active material described above, a negative electrode binder, a negative electrode conductive agent, a normal temperature molten salt composition, a metal salt if necessary, and a solvent were mixed together, and the mixture was stirred (stirring time=15 minutes) using a rotary and revolutionary mixer. In this manner, a negative electrode mixture slurry containing a first negative electrode active material, a second negative electrode active material, a negative electrode binder, a normal temperature molten salt composition, and the like was prepared.

Polyvinylidene fluoride (PVDF) and styrene-butadiene rubber (SBR) were used as the negative electrode binder. As the solvent, an organic solvent (N-methyl-2-pyrrolidone) was used in the case of using polyvinylidene fluoride as the negative electrode binder and an aqueous solvent (pure water) was used in the case of using styrene-butadiene rubber as the negative electrode binder.

As the negative electrode conductive agent, fibrous carbon and flake graphite were used. In this case, the mixing ratio of fibrous carbon was set to 1% by weight and the mixing ratio of flake graphite was set to 0.5% by weight.

As the normal temperature molten salt composition, a normal temperature molten salt and a copolymer were used. In this case, the following eighteen normal temperature molten salts (salt A to salt R) were used and the following three copolymers (po A to po C) were used. KUREHA KF POLYMER KF #9200 manufactured by KUREHA CORPORATION was used as polyvinylidene fluoride, and acrylic polymer ARON A-20L manufactured by TOAGOSEI CO., LTD. was used as the polyacrylate salt.

Salt A: AOEMA $BF_4$ ((2-acryloyloxyethyl)trimethylammonium tetrafluoroborate having an acryloyl group as a reactive group)

Salt B: AOEMA TFSI ((2-acryloyloxyethyl)trimethylammonium bis(trifluoromethanesulfonyl)imide having an acryloyl group as a reactive group Salt C: BDP TFSI (tributyldodecylphosphonium bis(trifluoromethanesulfonyl)imide Salt D: MOA TFSI (methyltrioctylammonium bis(trifluoromethanesulfonyl)imide Salt E: MSPBA TFSI ((3-trimethoxysilylpropyl)tributylammonium bis(trifluoromethanesulfonyl)imide having an alkoxy group as a reactive group)

Salt F: ODMMSPA Cl (octadecyldimethyl(3-trimethoxysilylpropyl)ammonium chloride having an alkoxy group as a reactive group)

Salt G: EMI TFSI (1-ethyl-3-methylimidazolium bis(trifluoromethylsulfonyl)imide)

Salt H: BMP TFSI (tributylmethylphosphonium bis(trifluoromethanesulfonyl)imide)

Salt I: EMMP TFSI (triethylmethoxymethylphosphonium bis(trifluoromethanesulfonyl)imide)

Salt J: EBP TFSI (triethylbutylphosphonium bis(trifluoromethanesulfonyl)imide)

Salt K: BDP FSI (tributyldodecylphosphonium bis(fluorosulfonyl)imide)

Salt L: BP $PF_6$ (tetrabutylphosphonium hexafluorophosphate)

Salt M: HDP Cl (trihexyl(tetradecyl)phosphonium chloride)

Salt N: ES TFSI (triethylsulfonium bis(trifluoromethanesulfonyl)imide)

Salt O: EVI FSI (1-ethyl-3-vinylimidazolium bis(fluorosulfonyl)imide)

Salt P: EMI FSI (1-ethyl-3-methylimidazolium bis(fluorosulfonyl)imide)

Salt Q: MEMPry TFSI (N(2-methoxyethyl)-Nmethylpyrrolidinium bis(trifluoromethanesulfonyl)imide)

Salt R: HMPy TFSI (1-hexyl-4-methylpyridinium bis(trifluoromethanesulfonyl)imide)

Po A: copolymer of polyvinylidene fluoride and AOEMA TFSI having an acryloyl group as a reactive group Po B: copolymer of sodium polyacrylate and OHEMA TFSI (N⁻oleyl-N,N⁻di(2-hydroxyethyl)-N⁻methylammonium bis(trifluoromethanesulfonyl)imide)

Po C: copolymer of sodium polyacrylate and MSPBA $BF_4$ ((3-trimethoxysilylpropyl)tributylammonium tetrafluoroborate) having an alkox group as a reactive group As the metal salt, lithium tetrafluoroborate ($LiBF_4$) and lithium trifluoromethanesulfonate (LiTFSI) were used.

The mixing ratio (% by weight) of each of the first negative electrode active material, the second negative electrode active material, the negative electrode binder, and the normal temperature molten salt composition and the content (mol/dm³=(mol/l)) of the metal salt are as presented in Tables 1 and 2. The content of the metal salt is a content with respect to the normal temperature molten salt composition.

As presented in Tables 1 and 2, a covering material was not used in the case of using a copolymer (po A to po C) as a normal temperature molten salt composition since the copolymer having a reactive group was bonded to the silicon-based material and thus performs a function similar to that of the covering portion.

TABLE 1

| Experimental Example | First negative electrode active material (carbon-based material) | | Second negative electrode active material | | | | Negative electrode binder | | Normal temperature molten salt composition | | Metal salt | |
|---|---|---|---|---|---|---|---|---|---|---|---|---|
| | | | | Covering material | | | | | | | | |
| | Kind | Mixing ratio (% by weight) | Silicon-based material Kind | Kind | Occupation proportion (% by weight) | Mixing ratio (% by weight) | Kind | Mixing ratio (% by weight) | Kind | Mixing ratio (% by weight) | Kind | Content (mol/dm³) |
| 1-1 | MCMB | 85.5 | Si | SPA | 5.3 | 10 | PVDF | 1.5 | Salt A | 1.5 | — | — |
| 1-2 | MCMB | 85.5 | Si | SPA | 5.3 | 10 | PVDF | 2.5 | Salt A | 0.5 | — | — |
| 1-3 | MCMB | 85.5 | Si | SPA | 5.3 | 10 | PVDF | 2.5 | Salt B | 0.5 | — | — |
| 1-4 | MCMB | 85.5 | Si | SPA | 5.3 | 10 | PVDF | 2.5 | Salt C | 0.5 | — | — |
| 1-5 | MCMB | 85.5 | Si | SPA | 5.3 | 10 | PVDF | 2.5 | Salt D | 0.5 | — | — |
| 1-6 | MCMB | 85.5 | Si | SPA | 5.3 | 10 | PVDF | 2.5 | Salt E | 0.5 | — | — |
| 1-7 | MCMB | 85.5 | Si | SPA | 5.3 | 10 | PVDF | 2.5 | Salt F | 0.5 | — | — |
| 1-8 | MCMB | 85.5 | Si | SPA | 5.3 | 10 | PVDF | 2.5 | Salt G | 0.5 | — | — |
| 1-9 | MCMB | 85.5 | Si | SPA | 5.3 | 10 | PVDF | 2.5 | Salt H | 0.5 | — | — |
| 1-10 | MCMB | 85.5 | Si | SPA | 5.3 | 10 | PVDF | 2.5 | Salt I | 0.5 | — | — |
| 1-11 | MCMB | 85.5 | Si | SPA | 5.3 | 10 | PVDF | 2.5 | Salt J | 0.5 | — | — |

TABLE 1-continued

| | First negative electrode active material (carbon-based material) | | Second negative electrode active material | | | | Negative electrode binder | | Normal temperature molten salt composition | | Metal salt | |
|---|---|---|---|---|---|---|---|---|---|---|---|---|
| | | Mixing ratio | Silicon-based material | | Covering material | | | Mixing ratio | | Mixing ratio | | Content |
| Experimental Example | Kind | (% by weight) | Kind | Kind | Occupation proportion (% by weight) | Mixing ratio (% by weight) | Kind | (% by weight) | Kind | (% by weight) | Kind | (mol/dm$^3$) |
| 1-12 | MCMB | 85.5 | Si | SPA | 5.3 | 10 | PVDF | 2.5 | Salt K | 0.5 | — | — |
| 1-13 | MCMB | 85.5 | Si | SPA | 5.3 | 10 | PVDF | 2.5 | Salt L | 0.5 | — | — |
| 1-14 | MCMB | 85.5 | Si | SPA | 5.3 | 10 | PVDF | 2.5 | Salt M | 0.5 | — | — |
| 1-13 | MCMB | 85.5 | Si | SPA | 5.3 | 10 | PVDF | 2.5 | Salt N | 0.5 | — | — |
| 1-16 | MCMB | 85.5 | Si | SPA | 5.3 | 10 | PVDF | 2.5 | Salt O | 0.5 | — | — |

TABLE 2

| | First negative electrode active material (carbon-based material) | | Second negative electrode active material | | | | Negative electrode binder | | Normal temperature molten salt composition | | Metal salt | |
|---|---|---|---|---|---|---|---|---|---|---|---|---|
| | | Mixing ratio | Silicon-based material | | Covering material | | | Mixing ratio | | Mixing ratio | | Content |
| Experimental Example | Kind | (% by weight) | Kind | Kind | Occupation proportion (% by weight) | Mixing ratio (% by weight) | Kind | (% by weight) | Kind | (% by weight) | Kind | (mol/dm$^3$) |
| 1-17 | MCMB | 85.5 | Si | SPA | 5.3 | 10 | PVDF | 2.5 | Salt P | 0.5 | — | — |
| 1-18 | MCMB | 85.5 | Si | SPA | 5.3 | 10 | PVDF | 2.5 | Salt Q | 0.5 | — | — |
| 1-19 | MCMB | 85.5 | Si | SPA | 5.3 | 10 | PVDF | 2.5 | Salt R | 0.5 | — | — |
| 1-20 | MCMB | 85.5 | SiTi$_{0.3}$ | SPA | 5.3 | 10 | PVDF | 2.5 | Salt I | 0.5 | — | — |
| 1-21 | MCMB | 85.5 | SiO | SPA | 5.3 | 10 | PVDF | 2.5 | Salt I | 0.5 | — | — |
| 1-22 | MCMB | 85.5 | Si | — | — | 10 | PVDF | 1.5 | Po A | 1.5 | — | — |
| 1-23 | MCMB | 86.5 | Si | — | — | 10 | SBR | 1 | Po B | 1 | — | — |
| 1-24 | MCMB | 86.5 | Si | — | — | 10 | SBR | 1 | Po C | 1 | — | — |
| 1-25 | MCMB | 85.5 | Si | SPA | 5.3 | 10 | PVDF | 1.5 | Salt A | 1.5 | LiBF$_4$ | 1 |
| 1-26 | MCMB | 85.5 | Si | SPA | 5.3 | 10 | PVDF | 1.5 | Salt A | 1.5 | LiTFSI | 1 |
| 1-27 | MCMB | 85.5 | Si | SPA | 5.3 | 10 | PVDF | 3 | — | — | — | — |
| 1-28 | MCMB | 85.5 | Si | SPA | 5.3 | 10 | PVDF | 3 | — | — | LiBF$_4$ | 1 |
| 1-29 | MCMB | 95.5 | — | — | — | — | PVDF | 1.5 | Po A | 1.5 | — | — |

Subsequently, the negative electrode mixture slurry was applied to one surface of a negative electrode current collector (12 μm thick copper foil) using a coating apparatus and then dried (drying temperature=120° C.) to form a negative electrode material layer. Finally, the negative electrode active material layer was compression-molded using a hand press, and then vacuum-dried. In this case, the volume density of the negative electrode active material layer was set to 1.8 g/cm$^3$.

The composition of the negative electrode active material layer formed using the negative electrode mixture slurry is as presented in Tables 3 and 4.

TABLE 3

| | | Second negative electrode active material | | | | | | |
|---|---|---|---|---|---|---|---|---|
| Experimental Example | First negative electrode active material (carbon-based material) | Center portion (silicon-based material) | Covering portion (covering material) | Negative electrode binder | Normal temperature molten salt composition | Metal salt | Capacity retention (normalized) | Heat generated (normalized) |
| 1-1 | MCMB | Si | SPA | PVDF | Salt A | — | 116 | 57 |
| 1-2 | MCMB | Si | SPA | PVDF | Salt A | — | 105 | 77 |
| 1-3 | MCMB | Si | SPA | PVDF | Salt B | — | 108 | 59 |
| 1-4 | MCMB | Si | SPA | PVDF | Salt C | — | 110 | 79 |
| 1-5 | MCMB | Si | SPA | PVDF | Salt D | — | 105 | 85 |
| 1-6 | MCMB | Si | SPA | PVDF | Salt E | — | 110 | 58 |
| 1-7 | MCMB | Si | SPA | PVDF | Salt F | — | 102 | 66 |
| 1-8 | MCMB | Si | SPA | PVDF | Salt G | — | 104 | 97 |
| 1-9 | MCMB | Si | SPA | PVDF | Salt H | — | 118 | 65 |

TABLE 3-continued

| | | Second negative electrode active material | | | | | | |
|---|---|---|---|---|---|---|---|---|
| Experimental Example | First negative electrode active material (carbon-based material) | Center portion (silicon-based material) | Covering portion (covering material) | Negative electrode binder | Normal temperature molten salt composition | Metal salt | Capacity retention (normalized) | Heat generated (normalized) |
| 1-10 | MCMB | Si | SPA | PVDF | Salt I | — | 126 | 58 |
| 1-11 | MCMB | Si | SPA | PVDF | Salt J | — | 110 | 59 |
| 1-12 | MCMB | Si | SPA | PVDF | Salt K | — | 127 | 62 |
| 1-13 | MCMB | Si | SPA | PVDF | Salt L | — | 104 | 65 |
| 1-14 | MCMB | Si | SPA | PVDF | Salt M | — | 109 | 67 |
| 1-15 | MCMB | Si | SPA | PVDF | Salt N | — | 130 | 66 |
| 1-16 | MCMB | Si | SPA | PVDF | Salt O | — | 122 | 78 |

TABLE 4

| | | Second negative electrode active material | | | | | | |
|---|---|---|---|---|---|---|---|---|
| Experimental Example | First negative electrode active material (carbon-based material) | Center portion (silicon-based material) | Covering portion (covering material) | Negative electrode binder | Normal temperature molten salt composition | Metal salt | Capacity retention (normalized) | Heat generated (normalized) |
| 1-17 | MCMB | Si | SPA | PVDF | Salt P | — | 122 | 84 |
| 1-18 | MCMB | Si | SPA | PVDF | Salt Q | — | 107 | 84 |
| 1-19 | MCMB | Si | SPA | PVDF | Salt R | — | 111 | 89 |
| 1-20 | MCMB | SiTi$_{0.3}$ | SPA | PVDF | Salt I | — | 131 | 55 |
| 1-21 | MCMB | SiO | SPA | PVDF | Salt I | — | 134 | 58 |
| 1-22 | MCMB | Si | — | PVDF | Po A | — | 102 | 47 |
| 1-23 | MCMB | Si | — | SBR | Po B | — | 102 | 47 |
| 1-24 | MCMB | Si | — | SBR | Po C | — | 108 | 52 |
| 1-25 | MCMB | Si | SPA | PVDF | Salt A | LiBF$_4$ | 130 | 65 |
| 1-26 | MCMB | Si | SPA | PVDF | Salt A | LiTFSI | 123 | 60 |
| 1-27 | MCMB | Si | SPA | PVDF | — | — | 100 | 100 |
| 1-28 | MCMB | Si | SPA | PVDF | — | LiBF$_4$ | 102 | 97 |
| 1-29 | MCMB | — | — | PVDF | Po A | — | 143 | 125 |

In the case of preparing an electrolytic solution, a solvent (ethylene carbonate and propylene carbonate) and an electrolyte salt (lithium hexafluorophosphate) were mixed together, and then the mixture was stirred. In this case, the mixing ratio (weight ratio) of solvent was set to ethylene carbonate:propylene carbonate=50:50. In addition, the content of the electrolyte salt was set to be 1 mol/dm$^3$ with respect to the solvent.

In the case of assembling a secondary battery, first, the test electrode 51 was punched into a pellet shape and the counter electrode 53 was punched into a pellet shape. Subsequently, the test electrode 51 and the counter electrode 53 were stacked with the separator 55 (microporous polyethylene film, thickness=5 μm), which was impregnated with the electrolytic solution, interposed therebetween to obtain a stacked body. Finally, the stacked body was housed in the exterior cap 54, the exterior can 52 and the exterior cap 54 were then crimped with the gasket 56 interposed therebetween.

In this manner, the test electrode 51, the counter electrode 53, the separator 55, the electrolytic solution, and the like were housed inside the exterior can 52 and the exterior cap 54, and a secondary battery of a coin type was thus completed.

The load characteristics and the heat generation characteristics were examined as the battery characteristics of the secondary battery, and the results presented in Tables 3 and 4 were attained.

In the case of examining the load characteristics, the capacity retention (%) was determined by performing a load test using the secondary battery of a coin type illustrated in FIG. 15.

In this case, in order to stabilize the battery state, the secondary battery was first charged and discharged (1 cycle) in a normal temperature environment (23° C.). Subsequently, the secondary battery was charged and discharged (3 cycles) in the same environment to measure the discharge capacity in the second cycle and the discharge capacity in the fourth cycle.

At the time of charge in the first to fourth cycles, constant current charge was performed at a current of 0.2 C until the voltage reached 4.3 V and then constant voltage charge was performed at a voltage of 4.3 V until the current reached 0.025 C. At the time of discharge in the first to fourth cycles, constant current discharge was performed at a predetermined current until the voltage reached 2.5 V. In this case, the current at the time of discharge in the first cycle and the second cycle was set to 0.2 C, the current at the time of discharge in the third cycle was set to 0.5 C, and the current at the time of discharge in the fourth cycle was set to 2 C. 0.2 C is a current value at which the battery capacity (theoretical capacity) can be fully discharged in 5 hours, 0.025 C is a current value at which the battery capacity can be fully discharged in 40 hours, 0.5 C is a current value at which the battery capacity can be fully discharged in 2 hours, and 2 C is a current value at which the battery capacity (theoretical capacity) can be fully discharged in 0.5 hour.

Finally, capacity retention (%)=(discharge capacity in fourth cycle/discharge capacity in second cycle)×100 was calculated. However, in Tables 3 and 4, a value normalized by regarding the value of capacity retention in a case in which a normal temperature molten salt composition was not used (Experimental Example 1-27) as 100% is presented as the value of capacity retention.

In the case of examining the heat generation characteristics, the quantity of heat generated per charge capacity of secondary battery (mW/mAh, hereinafter simply referred to as "quantity of heat generated") was determined by the following procedure using a differential scanning calorimeter (DSC).

Figure 16:
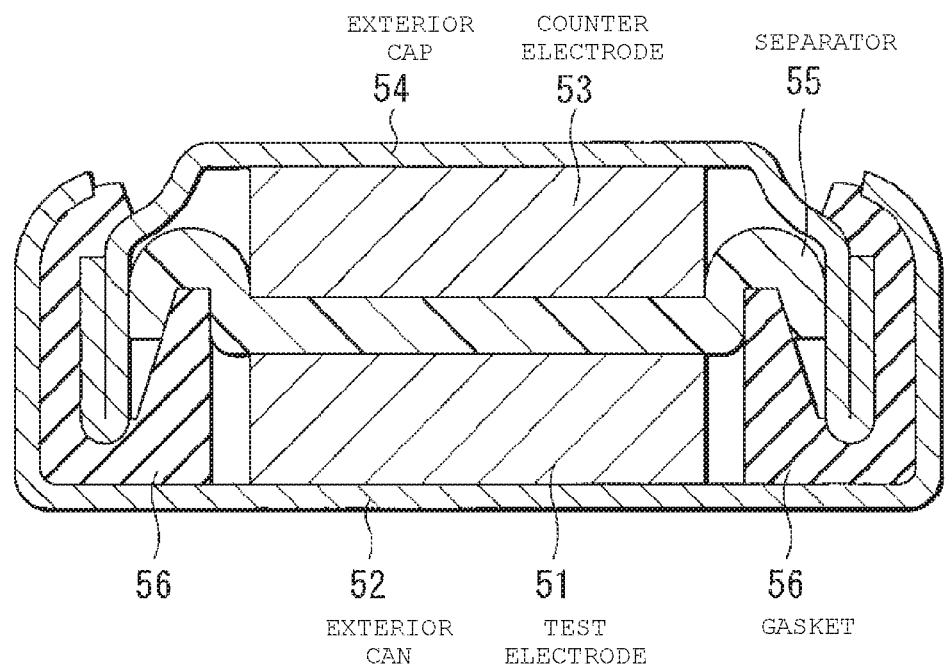
FIG. 16 is a sectional view illustrating the configuration of another secondary battery (coin type) for test according to an embodiment of the present technology.

In this case, as the first simple secondary battery to be used in the measurement of the quantity of heat generated, a secondary battery (counter electrode lithium metal secondary battery) of a coin type, which was a secondary battery for test illustrated in FIG. 16, was first fabricated. In the case of fabricating this simple secondary battery, a procedure similar to that for fabricating the secondary battery of a coin type illustrated in FIG. 15 was performed except that the counter electrode 53 (positive electrode active material was lithium cobaltate) was used as the test electrode 51 and a lithium metal plate (thickness=1 mm) was used as the counter electrode 53.

Subsequently, as the second simple secondary battery to be used in the measurement of the quantity of heat generated, a secondary battery (counter electrode lithium metal secondary battery) of a coin type, which was a secondary battery for test illustrated in FIG. 16, was fabricated. In the case of fabricating this simple secondary battery, a similar fabrication procedure was performed except that the test electrode 51 (the negative electrode active material was the first negative electrode active material and the second negative electrode active material) described above was used as the test electrode 51 and a lithium metal plate (thickness=1 mm) was used as the counter electrode 53.

Subsequently, each of the two simple secondary batteries described above was charged. The charge conditions were set to be similar to the charge conditions in the case of examining the load characteristics described above. Subsequently, the test electrode 51 (containing the positive electrode active material) in a charged state was recovered from the first simple secondary battery and the test electrode 51 (containing the first negative electrode active material and the second negative electrode active material) in a charged state was recovered from the second simple secondary battery. Subsequently, a separator (microporous polyethylene film, thickness=5 μm) was sandwiched between the two test electrodes 51, and thus an electrode sample in which the two test electrodes 51 were stacked one on the other with a separator interposed therebetween was fabricated. Subsequently, the electrode sample was housed in a sample pan for thermal analysis made of SUS plated with gold, and then the DSC curve was acquired by thermally analyzing the electrode sample using DSC. In this thermal analysis, the rate of temperature increase was set to 20° C./min.

Finally, the maximum value (mW) of the peak in the vicinity of 270° C. was determined based on the DSC curve, and then the quantity of heat generated (mW/mAh) was calculated by dividing the maximum value by the charge capacity (mAh). However, the "charge capacity" described here is the charge capacity in the second cycle at the time of the load test described above. In addition, in Tables 3 and 4, a value normalized by regarding the value of quantity of heat generated in a case in which a normal temperature molten salt composition was not used (Experimental Example 1-27) as 100% is presented as the value of quantity of heat generated.

As presented in Tables 3 and 4, each of the capacity retention and the quantity of heat generated was greatly fluctuated depending on the presence or absence of a normal temperature molten salt composition.

Specifically, in a case in which a normal temperature molten salt composition was used in a mixed system of a carbon-based material and a silicon-based material (Experimental Examples 1-1 to 1-26), the capacity retention increased and the quantity of heat generated decreased as compared with a case in which a normal temperature molten salt composition was not used in the mixed system (Experimental Examples 1-27 and 1-28).

Particularly in a case in which a normal temperature molten salt composition (normal temperature molten salt) was used in a mixed system of a carbon-based material and a silicon-based material (Experimental Examples 1-1 to 1-21), the quantity of heat generated further decreased when the normal temperature molten salt composition had a reactive group (Experimental Examples 1-1 to 1-3, 1-6, and 1-7).

In a case in which a normal temperature molten salt composition was used in a single system of carbon-based material (Experimental Example 1-29), the capacity retention greatly increased and the quantity of heat generated also greatly increased as compared with a case in which a normal temperature molten salt composition was not used in a mixed system of a carbon-based material and a silicon-based material (Experimental Example 1-27).

Experimental Examples 2-1 to 2-16

Next, a secondary battery including the negative electrode of the second embodiment described above was fabricated, and the battery characteristics of the secondary battery were evaluated.

A secondary battery (lithium ion secondary battery) of a coin type illustrated in FIG. 15 was fabricated by a similar procedure except those to be described below.

In the case of fabricating the test electrode 51, a silicon-based material, an aqueous solution of a covering material, a normal temperature molten salt composition, a metal salt (lithium tetrafluoroborate) and a conductive material (single wall carbon nanotube (CNT), TUBALL (registered trademark) manufactured by OCSiAl) if necessary, and a solvent were first mixed together.

As the silicon-based material (median diameter D50=3 μm), elemental silicon (Si) and a silicon compound (SiO) were used. As the covering material, polyvinylpyrrolidone (PVP), polyvinylidene fluoride (PVDF), and sodium polyacrylate (SPA) which was a polyacrylate salt were used. As the solvent, an organic solvent (N⁻methyl-2-pyrrolidone) was used In the case of using polyvinylpyrrolidone and polyvinylidene fluoride as the covering material and an aqueous solvent (pure water) was used In the case of using sodium polyacrylate as the covering material. Subsequently, the mixture was stirred (stirring time=1 hour) using a stirrer to obtain a dispersion containing a silicon-based material, a covering material, and a normal temperature molten salt composition. Subsequently, the dispersion was sprayed using a spray drying apparatus and then dried (drying temperature=120° C.). In this manner, the surface of the center portion containing a silicon-based material was covered with the covering portion containing a covering material, a normal temperature molten salt composition and the like, and a second negative electrode active material was thus obtained.

The content (% by weight) of each of the normal temperature molten salt composition and the conductive material, the content (mol/dm$^3$=(mol/l)) of the metal salt, the occupation proportion (% by weight) of the covering material are as presented in Tables 5 and 6. The content of the normal temperature molten salt composition is the proportion of the weight of the normal temperature molten salt composition to the sum of the weight of the center portion and the weight of the covering portion and the content of the conductive material is the proportion of the weight of the conductive material to the sum of the weight of the center portion and the weight of the covering portion. The weight of the covering portion described here is the sum of the weight of the covering material, the weight of the normal temperature molten salt composition, and the weight of the conductive material in the same manner as the weight of the covering portion to be used to calculate the occupation proportion of the covering material. The content of the metal salt is a content with respect to the normal temperature molten salt composition.

TABLE 5

| | First negative electrode active material (carbon-based material) | | Second negative electrode active material | | | | | | |
|---|---|---|---|---|---|---|---|---|---|
| | | | | Covering material | | Normal temperature molten salt composition | | | |
| | | Mixing ratio | Silicon-based material | | Occupation proportion | | Content | Metal salt | |
| Experimental Example | Kind | (% by weight) | Kind | Kind | (% by weight) | Kind | (% by weight) | Kind | Content (mol/dm$^3$) |
| 2-1 | MCMB | 85.5 | Si | PVP | 2 | Salt I | 3.3 | — | — |
| 2-2 | MCMB | 85.5 | Si | PVDF | 2 | Salt I | 3.3 | — | — |
| 2-3 | MCMB | 85.5 | Si | PVP | 2 | Salt P | 3.3 | — | — |
| 2-4 | MCMB | 85.5 | Si | SPA | 2 | Salt S | 3.3 | — | — |
| 2-5 | MCMB | 85.5 | Si | SPA | 4 | Salt S | 1.3 | — | — |
| 2-6 | MCMB | 85.5 | Si | SPA | 2 | Salt S | 3.3 | LiBF$_4$ | 1 |
| 2-7 | MCMB | 85.5 | Si | SPA | 2 | Salt S | 3.3 | LiBF$_4$ | 1 |
| 2-8 | MCMB | 64.0 | SiO | PVP | 2 | Salt I | 3.3 | — | — |
| 2-9 | NGr | 64.0 | SiO | PVP | 2 | Salt I | 3.3 | — | — |

| | Second negative electrode active material | | | Negative electrode binder | | Normal temperature molten salt composition | |
|---|---|---|---|---|---|---|---|
| | Conductive material | | Mixing ratio | | Mixing ratio | | Mixing ratio |
| Experimental Example | Kind | Content (% by weight) | (% by weight) | Kind | (% by weight) | Kind | (% by weight) |
| 2-1 | — | — | 10 | SPA | 3 | — | — |
| 2-2 | — | — | 10 | SPA | 3 | — | — |
| 2-3 | — | — | 10 | SPA | 3 | — | — |
| 2-4 | — | — | 10 | PVDF | 3 | — | — |
| 2-5 | — | — | 10 | PVDF | 3 | — | — |
| 2-6 | CNT | 1 | 10 | PVDF | 3 | — | — |
| 2-7 | CNT | 1 | 10 | PVDF | 2.5 | Salt A | 0.5 |
| 2-8 | — | — | 30 | SPA | 4.5 | — | — |
| 2-9 | — | — | 30 | SPA | 4.5 | — | — |

TABLE 6

| | First negative electrode active material (carbon-based material) | | Second negative electrode active material | | | | | | |
|---|---|---|---|---|---|---|---|---|---|
| | | | | Covering material | | Normal temperature molten salt composition | | | |
| | | Mixing ratio | Silicon-based material | | Occupation proportion | | Content | Metal salt | |
| Experimental Example | Kind | (% by weight) | Kind | Kind | (% by weight) | Kind | (% by weight) | Kind | Content (mol/dm$^3$) |
| 2-10 | MCMB | 85.5 | Si | — | — | Po A | 5.3 | — | — |
| 2-11 | MCMB | 85.5 | Si | — | — | Po A | 5.3 | — | — |

TABLE 6-continued

| | | | | | | | | | |
|---|---|---|---|---|---|---|---|---|---|
| 2-12 | MCMB | 85.5 | Si | — | — | Po A | 5.3 | — | — |
| 2-13 | MCMB | 85.5 | Si | — | — | Po B | 5.3 | — | — |
| 2-14 | MCMB | 85.5 | Si | SPA | 2 | Po B | 3.3 | — | — |
| 2-15 | MCMB | 85.5 | SiO | PVP | 5.3 | — | — | — | — |
| 2-16 | MCMB | 64.0 | SiO | PVP | 5.3 | — | — | — | — |

| | Second negative electrode active material | | | Negative electrode binder | | Normal temperature molten salt composition | |
|---|---|---|---|---|---|---|---|
| | Conductive material | | Mixing | | Mixing | | Mixing |
| Experimental Example | Kind | Content (% by weight) | ratio (% by weight) | Kind | ratio (% by weight) | Kind | ratio (% by weight) |
| 2-10 | — | — | 10 | SBR | 1 | — | — |
| 2-11 | — | — | 10 | SPA | 3 | — | — |
| 2-12 | — | — | 10 | PI | 3 | — | — |
| 2-13 | — | — | 10 | PVDF | 3 | — | — |
| 2-14 | — | — | 10 | PVDF | 3 | — | — |
| 2-15 | — | — | 10 | SPA | 3 | — | — |
| 2-16 | — | — | 30 | SPA | 4.5 | — | — |

Subsequently, a first negative electrode active material, the second negative electrode active material described above, a negative electrode binder, a negative electrode conductive agent, an additional normal temperature molten salt composition if necessary, and a solvent were mixed together, and the mixture was stirred (stirring time=15 minutes) using a rotary and revolutionary mixer.

As the first negative electrode active material (median diameter D50=21 μm), mesocarbon microbeads (MCMB) and natural graphite (NGr), which were carbon materials, were used. In this manner, a negative electrode mixture slurry containing a first negative electrode active material, a second negative electrode active material, a negative electrode binder, and the like was obtained.

Polyvinylidene fluoride (PVDF), styrene-butadiene rubber (SBR), sodium polyacrylate (SPA), and polyimide (PI) were used as the negative electrode binder. As the solvent, an organic solvent (N-methyl-2-pyrrolidone) was used in the case of using polyvinylidene fluoride as the negative electrode binder and an aqueous solvent (pure water) was used in the case of using styrene-butadiene rubber (SBR), sodium polyacrylate (SPA), and polyimide (PI) as the negative electrode binder.

As the negative electrode conductive agent, fibrous carbon and flake graphite were used. In this case, the mixing ratio of fibrous carbon was set to 1% by weight and the mixing ratio of flake graphite was set to 0.5% by weight.

As the normal temperature molten salt composition, a normal temperature molten salt and a copolymer were used. In this case, the two normal temperature molten salts (salt I and salt P) described above and the following one normal temperature molten salt (salt S) were used and the two copolymers (po A and po B) described above were used. As the additional normal temperature molten salt composition, the normal temperature molten salt (salt A) described above was used.

Salt S: OHEMA TFSI (N⁻oleyl-N,N⁻di(2-hydroxyethyl)-N⁻methylammonium bis(trifluoromethanesulfonyl)imide having a hydroxy group as a reactive group)

The mixing ratio (% by weight) of each of the first negative electrode active material, the second negative electrode active material, the negative electrode binder, and the additional normal temperature molten salt composition are as presented in Tables 5 and 6.

As presented in Tables 5 and 6, in the case of using a copolymer (po A and po B) as a normal temperature molten salt composition, a covering material was not used if necessary since the copolymer having a reactive group is bonded to the silicon-based material and thus performs a function similar to that of the covering portion.

The composition of the negative electrode active material layer formed using the negative electrode mixture slurry is as presented in Tables 7 and 8.

TABLE 7

| | | Second negative electrode active material | | | | | | | | |
|---|---|---|---|---|---|---|---|---|---|---|
| Experimental Example | First negative electrode active material (carbon-based material) | Center portion (silicon-based material) | Covering portion (covering material) | Normal temperature molten salt composition | Metal salt | Conductive material | Negative electrode binder | Normal temperature molten salt composition | Capacity retention (normalized) | Heat generated (normalized) |
| 2-1 | MCMB | Si | PVP | Salt I | — | — | SPA | — | 125 | 55 |
| 2-2 | MCMB | Si | PVDF | Salt I | — | — | SPA | — | 121 | 64 |
| 2-3 | MCMB | Si | PVP | Salt P | — | — | SPA | — | 115 | 70 |
| 2-4 | MCMB | Si | SPA | Salt S | — | — | PVDF | — | 124 | 70 |
| 2-5 | MCMB | Si | SPA | Salt S | — | — | PVDF | — | 129 | 88 |
| 2-6 | MCMB | Si | SPA | Salt S | LiBF₄ | CNT | PVDF | — | 143 | 71 |
| 2-7 | MCMB | Si | SPA | Salt S | LiBF₄ | CNT | PVDF | Salt A | 140 | 60 |

TABLE 7-continued

| | | Second negative electrode active material | | | | | | | | |
|---|---|---|---|---|---|---|---|---|---|---|
| Experimental Example | First negative electrode active material (carbon-based material) | Center portion (silicon-based material) | Covering portion (covering material) | Normal temperature molten salt composition | Metal salt | Conductive material | Negative electrode binder | Normal temperature molten salt composition | Capacity retention (normalized) | Heat generated (normalized) |
| 2-8 | MCMB | Si | PVP | Salt I | — | — | SPA | — | 103 | 93 |
| 2-9 | NGr | Si | PVP | Salt I | — | — | SPA | — | 109 | 102 |

TABLE 8

| | | Second negative electrode active material | | | | | | | | |
|---|---|---|---|---|---|---|---|---|---|---|
| Experimental Example | First negative electrode active material (carbon-based material) | Center portion (silicon-based material) | Covering portion (covering material) | Normal temperature molten salt composition | Metal salt | Conductive material | Negative electrode binder | Normal temperature molten salt composition | Capacity retention (normalized) | Heat generated (normalized) |
| 2-10 | MCMB | Si | — | Po A | — | — | SBR | — | 125 | 72 |
| 2-11 | MCMB | Si | — | Po A | — | — | SPA | — | 130 | 65 |
| 2-12 | MCMB | Si | — | Po A | — | — | PI | — | 130 | 90 |
| 2-13 | MCMB | Si | — | Po B | — | — | PVDF | — | 136 | 62 |
| 2-14 | MCMB | Si | SPA | Po B | — | — | PVDF | — | 132 | 55 |
| 2-15 | MCMB | SiO | PVP | — | — | — | SPA | — | 105 | 96 |
| 2-16 | MCMB | SiO | PVP | — | — | — | SPA | — | 74 | 137 |

The load characteristics and the heat generation characteristics were examined as the battery characteristics of the secondary battery, and the results presented in Tables 7 and 8 were attained. The procedure for examining each of the load characteristics and the heat generation characteristics is as described above. However, in Tables 7 and 8, a value normalized is presented as the value of capacity retention and a value normalized is presented as the value of quantity of heat generated in the same manner as in Tables 3 and 4.

As presented in Tables 7 and 8, even when the covering portion contains a normal temperature molten salt composition (Experimental Examples 2-1 to 2-14), the capacity retention increased and the quantity of heat generated decreased as compared with a case in which a normal temperature molten salt composition was not contained in the covering portion or the like (Experimental Examples 2-15 and 2-16).

Particularly in a case in which a normal temperature molten salt composition was contained in the covering portion or the like, the following tendency was attained. First, when the covering portion contained a metal salt and a conductive material (Experimental Examples 2-6 and 2-7), the capacity retention further increased. Second, when an additional normal temperature molten salt composition was used (Experimental Example 2-7), the quantity of heat generated further decreased. Third, when the covering portion contained a normal temperature molten salt composition together with a covering material (Experimental Example 2-14), the quantity of heat generated greatly decreased while a high capacity retention rate was maintained.

As presented in Tables 1 to 8, load characteristics and heat generation characteristics were both improved when the negative electrode contains a normal temperature molten salt composition together with the first negative electrode active material (carbon-based material) and the second negative electrode active material (silicon-based material). Consequently, excellent battery characteristics were attained in the secondary batteries.

The present technology has been described with reference to embodiments and Examples but is not limited to the aspects described in the embodiments and Examples, and various modifications can be made.

Specifically, a secondary battery of a cylindrical type, a secondary battery of a laminated film type, and a secondary battery of a coin type have been described, but the secondary battery is not limited thereto. For example, the secondary battery may be a secondary battery of a square type.

Moreover, a case in which the battery element has a winding structure has been described, but the present technology is not limited to this. For example, the battery element may have another structure such as a stacked structure.

Moreover, a lithium ion secondary battery has been described, but the present technology is not limited to this.

The secondary battery may be, for example, a secondary battery in which the capacity of the negative electrode is attained based on the sum of the capacity due to storage and release phenomena of lithium and the capacity due to precipitation and dissolution phenomena of lithium by setting the capacity of a negative electrode active material capable of storing and releasing lithium to be smaller than the capacity of the positive electrode.

Moreover, a secondary battery in which lithium is used as an electrode reactant has been described, but the present technology is not limited to this. The electrode active material may be, for example, other group 1 elements in the extended periodic table such as sodium and potassium, group 2 elements in the extended periodic table such as magnesium and calcium, or other light metals such as aluminum.

Moreover, for example, the electrolytic solution for secondary battery of the present technology may be applied not only to secondary batteries but also to other electrochemical devices. Other electrochemical devices are, for example, capacitors.

The effects described in the present specification are simply illustrative and are not limited. Moreover, there may be other effects.

The present technology is further described in detail according to an embodiment of the present disclosure.

(1)

A secondary battery including:

a positive electrode;

a negative electrode containing a first negative electrode active material containing a material containing carbon as a constituent element, a second negative electrode active material containing a material containing silicon as a constituent element, and a normal temperature molten salt composition; and an electrolytic solution.

(2)

The secondary battery according to (1), in which the normal temperature molten salt composition contains at least either of a normal temperature molten salt or a copolymer of the normal temperature molten salt and a polymer compound, the normal temperature molten salt contains at least one of a quaternary ammonium cation, a quaternary phosphonium cation, a tertiary sulfonium cation, an imidazolium cation, a pyridinium cation, or a pyrrolidinium cation, and the polymer compound contains at least one of a polyacrylate salt, polyacrylic acid, polyimide, or polyvinylidene fluoride.

(3)

The secondary battery according to (1) or (2), in which the normal temperature molten salt contains at least one of a bis(trifluoromethanesulfonyl)imide anion, a bis(fluorosulfonyl)imide anion, a tetrafluoroborate anion, a hexafluorophosphate anion, or a chloride anion.

(4)

The secondary battery according to any one of (1) to (3), in which the normal temperature molten salt composition contains at least one of an alkoxy group, a hydroxy group, an acryloyl group, or a methacryloyl group.

(5)

The secondary battery according to any one of (1) to (4), in which the negative electrode further contains a metal salt.

(6)

The secondary battery according to any one of (1) to (5), in which the negative electrode further contains a negative electrode binder, and the negative electrode binder contains at least one of polyvinylidene fluoride, styrene-butadiene rubber, polyimide, a polyacrylate salt, or polyacrylic acid.

(7)

The secondary battery according to any one of (1) to (6), in which the second negative electrode active material has:

a center portion containing the material containing silicon as a constituent element; and a covering portion that is provided on a surface of the center portion and contains at least one of a polyacrylate salt, polyacrylic acid, polyvinylidene fluoride, or polyvinylpyrrolidone.

(8)

The secondary battery according to (7), in which the covering portion contains the normal temperature molten salt composition.

(9)

The secondary battery according to (8), in which the normal temperature molten salt composition is bonded to the material containing silicon as a constituent element.

(10)

The secondary battery according to (8) or (9), in which the negative electrode further contains a metal salt, and the covering portion contains the metal salt.

(11)

The secondary battery according to any one of (8) to (10), in which the negative electrode further contains a negative electrode binder, the negative electrode binder contains at least one of polyvinylidene fluoride, styrene-butadiene rubber, polyimide, a polyacrylate salt, or polyacrylic acid, and the normal temperature molten salt composition is bonded to the negative electrode binder.

(12)

The secondary battery according to any one of (1) to (11), in which the secondary battery is a lithium ion secondary battery.

(13)

A negative electrode for secondary battery containing:

a first negative electrode active material containing a material containing carbon as a constituent element;

a second negative electrode active material containing a material containing silicon as a constituent element; and a normal temperature molten salt composition.

(14)

A battery pack including:

the secondary battery according to any one of (1) to (12);

a controller that controls operation of the secondary battery; and a switch unit that switches the operation of the secondary battery in accordance with an instruction from the controller.

(15)

An electric vehicle including:

the secondary battery according to any one of (1) to (12);

a converter that converts electric power supplied from the secondary battery into a driving force;

a driving unit to be driven in accordance with the driving force; and a controller that controls operation of the secondary battery.

(16)

An electric power storage system including:

the secondary battery according to any one of (1) to (12);

one or two or more electrical apparatuses to which electric power is supplied from the secondary battery; and a controller that controls electric power supply from the secondary battery to the electrical apparatuses.

(17)

An electric tool including:

the secondary battery according to any one of (1) to (12); and a moving unit to which electric power is supplied from the secondary battery.

(18)

An electronic device including:

the secondary battery according to any one of (1) to (12) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode;
a negative electrode including a first negative electrode active material, a second negative electrode active material, and a normal temperature molten salt composition; and
an electrolytic solution
wherein the first negative electrode active material includes a first material including carbon, and wherein the second negative electrode active material includes a second material including silicon,
wherein the second negative electrode active material includes:
a center portion including a silicon material; and
a covering portion that is provided on a surface of the center portion and includes at least one of a polyacrylate salt, polyacrylic acid, polyvinylidene fluoride, or polyvinylpyrrolidone, and
wherein the covering portion includes the normal temperature molten salt composition.

2. The secondary battery according to claim 1, wherein the normal temperature molten salt composition includes at least one of a normal temperature molten salt or a copolymer of the normal temperature molten salt and a polymer compound,
the normal temperature molten salt includes at least one of a quaternary ammonium cation, a quaternary phosphonium cation, a tertiary sulfonium cation, an imidazolium cation, a pyridinium cation, or a pyrrolidinium cation, and
the polymer compound includes at least one of a polyacrylate salt, polyacrylic acid, polyimide, or polyvinylidene fluoride.

3. The secondary battery according to claim 1, wherein the normal temperature molten salt includes at least one of a bis(trifluoromethanesulfonyl)imide anion, a bis(fluorosulfonyl)imide anion, a tetrafluoroborate anion, a hexafluorophosphate anion, or a chloride anion.

4. The secondary battery according to claim 1, wherein the normal temperature molten salt composition includes at least one of an alkoxy group, a hydroxy group, an acryloyl group, or a methacryloyl group.

5. The secondary battery according to claim 1, wherein the negative electrode further includes a metal salt.

6. The secondary battery according to claim 1, wherein the negative electrode further includes a negative electrode binder, and
the negative electrode binder includes at least one of polyvinylidene fluoride, styrene-butadiene rubber, polyimide, a polyacrylate salt, or polyacrylic acid.

7. The secondary battery according to claim 1, wherein the normal temperature molten salt composition is bonded to the silicon material.

8. The secondary battery according to claim 1, wherein the negative electrode further includes a metal salt, and the covering portion includes the metal salt.

9. The secondary battery according to claim 1, wherein the negative electrode further includes a negative electrode binder,
the negative electrode binder includes at least one of polyvinylidene fluoride, styrene-butadiene rubber, polyimide, a polyacrylate salt, or polyacrylic acid, and the normal temperature molten salt composition is bonded to the negative electrode binder.

10. The secondary battery according to claim 1, wherein the secondary battery includes a lithium ion secondary battery.

11. An electric vehicle comprising:
the secondary battery according to claim 1;
a converter configured to convert electric power supplied from the secondary battery into a driving force;
a driver configured to be driven in accordance with the driving force; and
a controller configured to control operation of the secondary battery.

12. An electric power storage system comprising:
the secondary battery according to claim 1;
one or two or more electrical apparatuses to which electric power is configured to be supplied from the secondary battery; and
a controller configured to control electric power supply from the secondary battery to the electrical apparatuses.

13. An electric tool comprising:
the secondary battery according to claim 1; and
a moving unit to which electric power is configured to be supplied from the secondary battery.

14. An electronic device comprising:
the secondary battery according to claim 1 as an electric power supply source.

15. A negative electrode for secondary battery comprising:
a first negative electrode active material including a first material including carbon;
a second negative electrode active material including a second material including silicon; and
a normal temperature molten salt composition,
wherein the second negative electrode active material includes:
a center portion including a silicon material; and
a covering portion that is provided on a surface of the center portion and includes at least one of a polyacrylate salt, polyacrylic acid, polyvinylidene fluoride, or polyvinylpyrrolidone, and
wherein the covering portion includes the normal temperature molten salt composition.

16. A battery pack comprising:
a secondary battery;
a controller configured to control operation of the secondary battery; and
a switch configured to switch operation of the secondary battery in accordance with an instruction from the controller,
wherein
the secondary battery includes
a positive electrode;
a negative electrode including a first negative electrode active material, a second negative electrode active material, and a normal temperature molten salt composition; and
an electrolytic solution,
wherein the first negative electrode active material includes a first material including carbon, and wherein the second negative electrode active material includes a second material including silicon, wherein the second negative electrode active material includes:

a center portion including a silicon material; and a covering portion that is provided on a surface of the center portion and includes at least one of a polyacrylate salt, polyacrylic acid, polyvinylidene fluoride, or polyvinylpyrrolidone, and wherein the covering portion includes the normal temperature molten salt composition.

* * * * *